(12) United States Patent
Skanse et al.

(10) Patent No.: US 9,290,333 B2
(45) Date of Patent: Mar. 22, 2016

(54) TRANSFER CONVEYOR

(71) Applicant: Intelligrated Headquarters, LLC, Mason, OH (US)

(72) Inventors: Randolph T. Skanse, Mason, OH (US); John J. Wilkins, Erlanger, KY (US)

(*) Notice: Subject to any disclaimer, the term of this patent is extended or adjusted under 35 U.S.C. 154(b) by 132 days.

(21) Appl. No.: 13/837,165

(22) Filed: Mar. 15, 2013

(65) Prior Publication Data

US 2014/0262684 A1 Sep. 18, 2014

(51) Int. Cl.
*B65G 47/54* (2006.01)

(52) U.S. Cl.
CPC ........................................ *B65G 47/54* (2013.01)

(58) Field of Classification Search
USPC ......... 198/369.6, 370.01, 370.03, 369.1, 597, 198/463.3, 809, 817, 570, 370.06
See application file for complete search history.

(56) References Cited

U.S. PATENT DOCUMENTS

| 406,724 | A | * | 7/1889 | Sobotta | ........................... 33/415 |
| 927,351 | A | * | 7/1909 | Hewitt | ........................ 271/3.18 |
| 3,861,324 | A | | 1/1975 | Shelstad | |
| 4,730,718 | A | * | 3/1988 | Fazio et al. | .................... 198/597 |
| 4,768,641 | A | | 9/1988 | Hibi et al. | |
| 4,880,099 | A | * | 11/1989 | Leemkuil et al. | .......... 198/370.1 |
| 4,930,613 | A | * | 6/1990 | Okura et al. | ............. 198/370.06 |
| 7,472,785 | B2 | | 1/2009 | Albright et al. | |
| 7,806,399 | B2 | * | 10/2010 | Dangelewicz et al. | ......... 271/95 |
| 8,684,169 | B2 | * | 4/2014 | Itoh et al. | ....................... 198/597 |
| 2006/0278501 | A1 | | 12/2006 | Sweazy | |
| 2009/0152074 | A1 | * | 6/2009 | Wolf | .............................. 198/617 |
| 2014/0041989 | A1 | * | 2/2014 | Wallace | ..................... 198/369.1 |

FOREIGN PATENT DOCUMENTS

WO WO 2009/026533 2/2009

OTHER PUBLICATIONS

International Search Report and Written Opinion dated Jul. 17, 2014 for Application No. PCT/US2014/027532.

\* cited by examiner

*Primary Examiner* — Gene Crawford
*Assistant Examiner* — Lester Rushin

(57) ABSTRACT

A material handling system incorporates one or more transfer conveyor sections configured to selectively discharge articles being conveyed in at least one direction which is disposed at a transverse angle relative to the incoming direction of the article. The transfer conveyor includes rotary cams with circumferential cam tracks which engage cam followers carried respective vertically movable conveying assemblies. Rotation of the cams disposes the carrying surfaces at desired conveying heights for selecting the discharge.

11 Claims, 26 Drawing Sheets

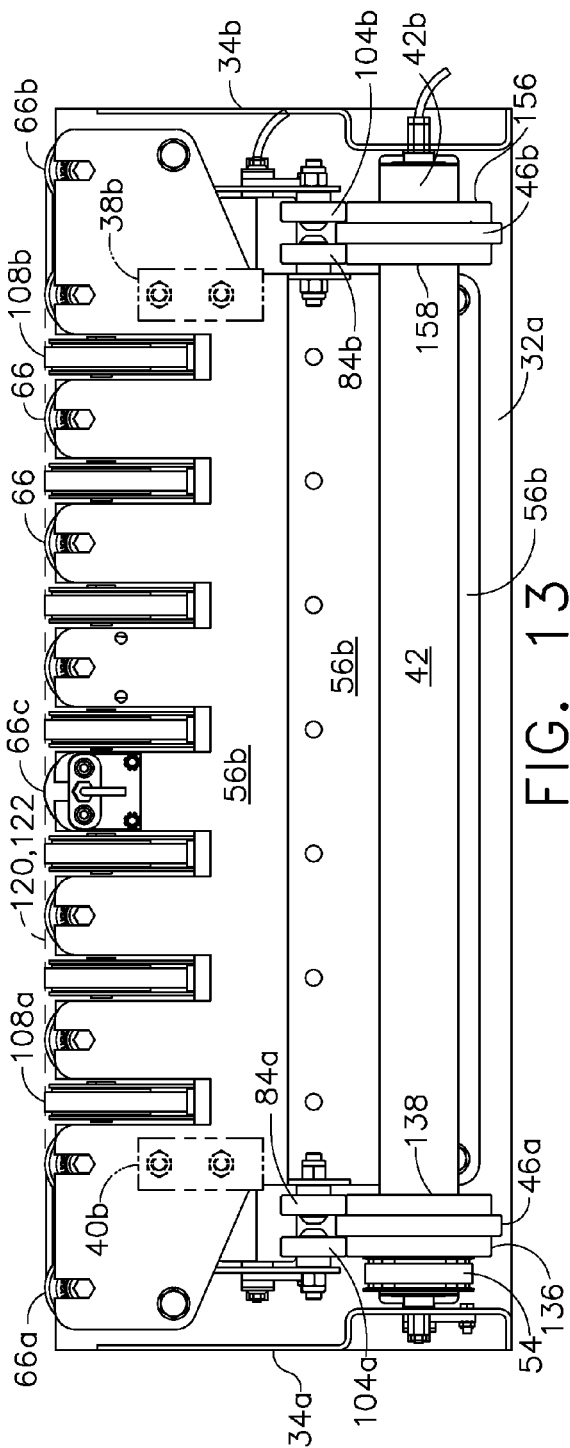
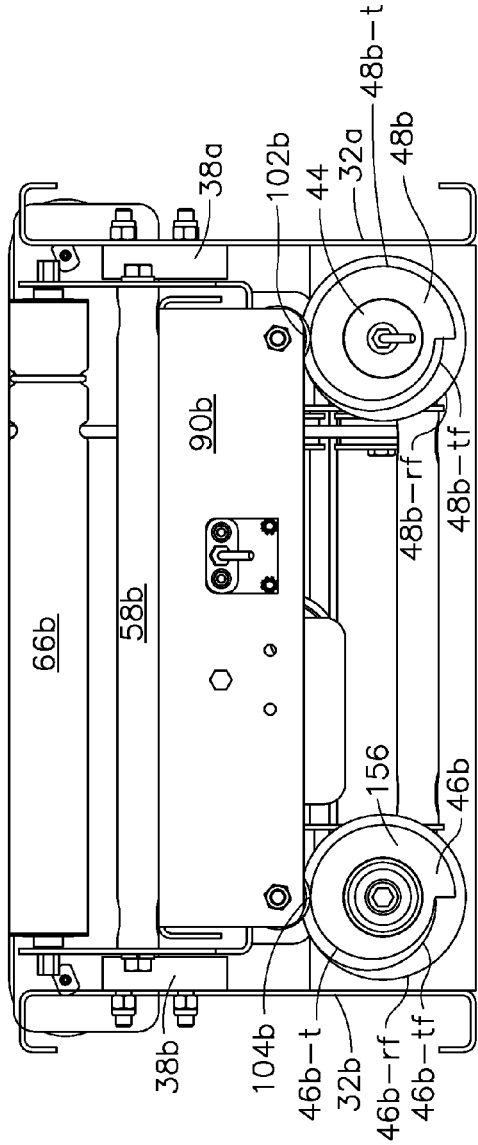
FIG. 13
FIG. 14

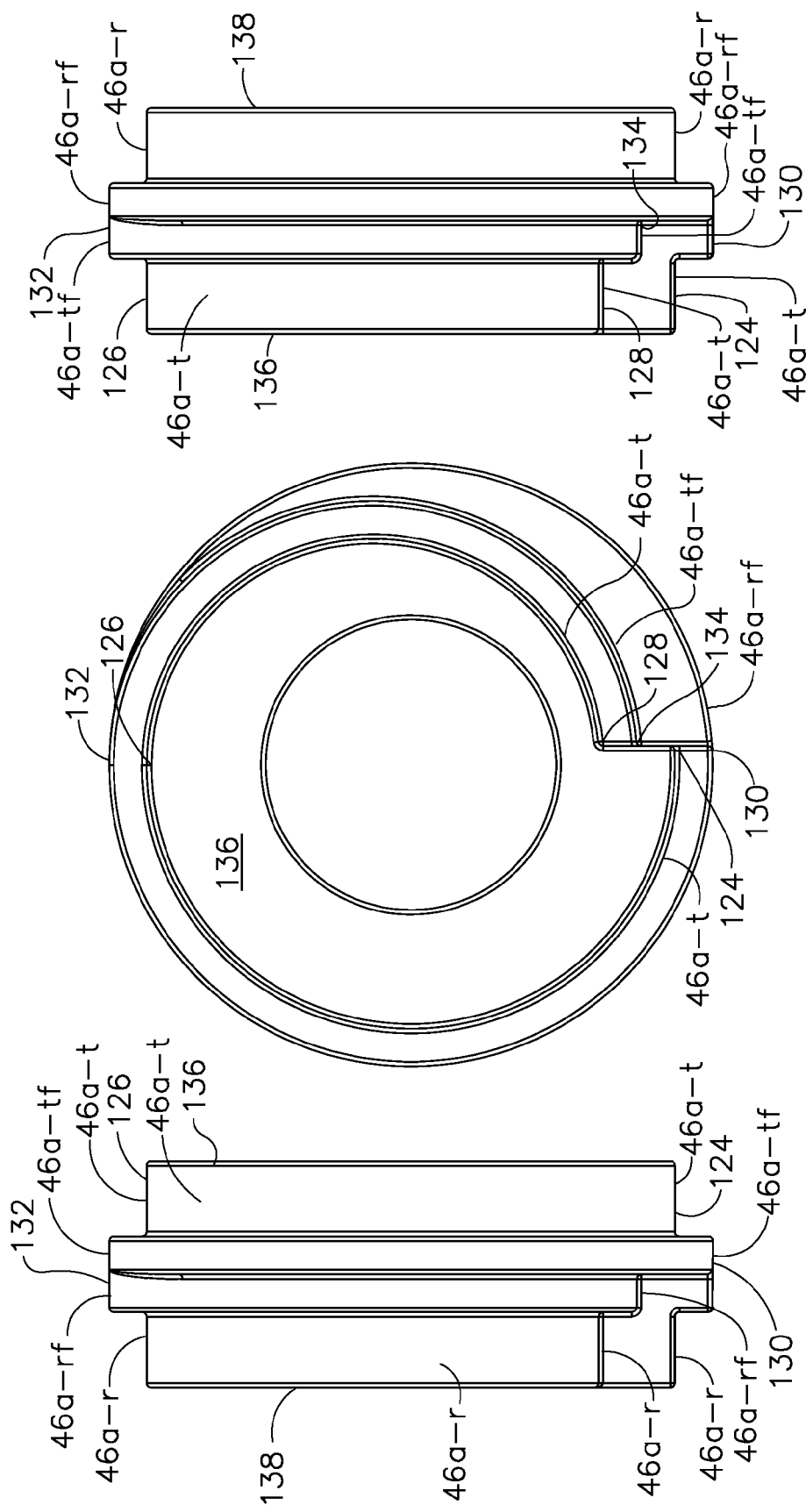

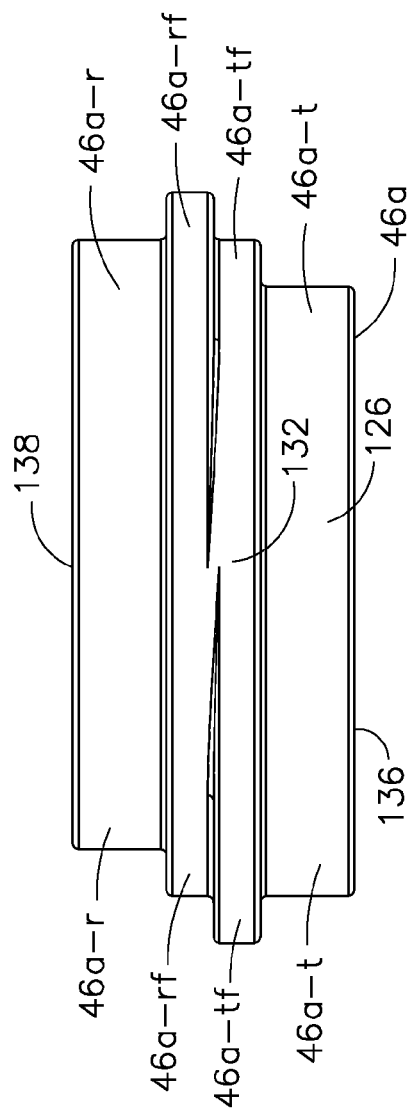
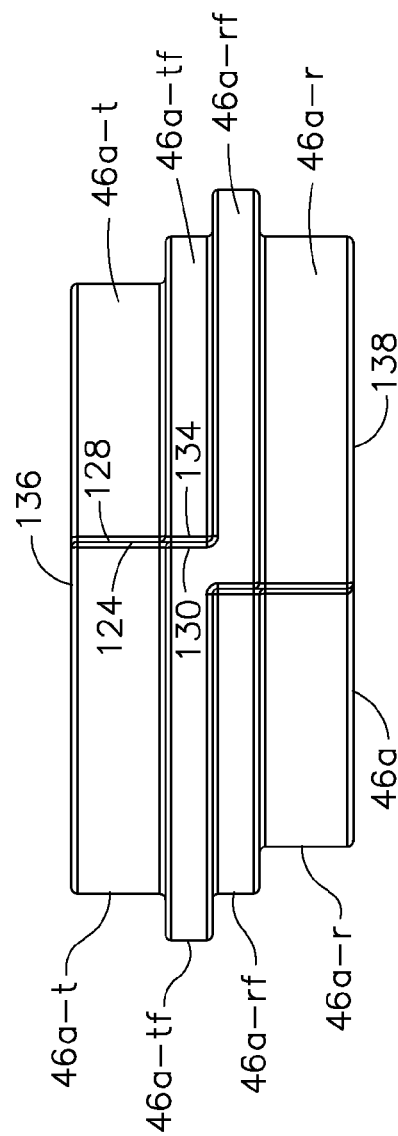
FIG. 27
FIG. 28

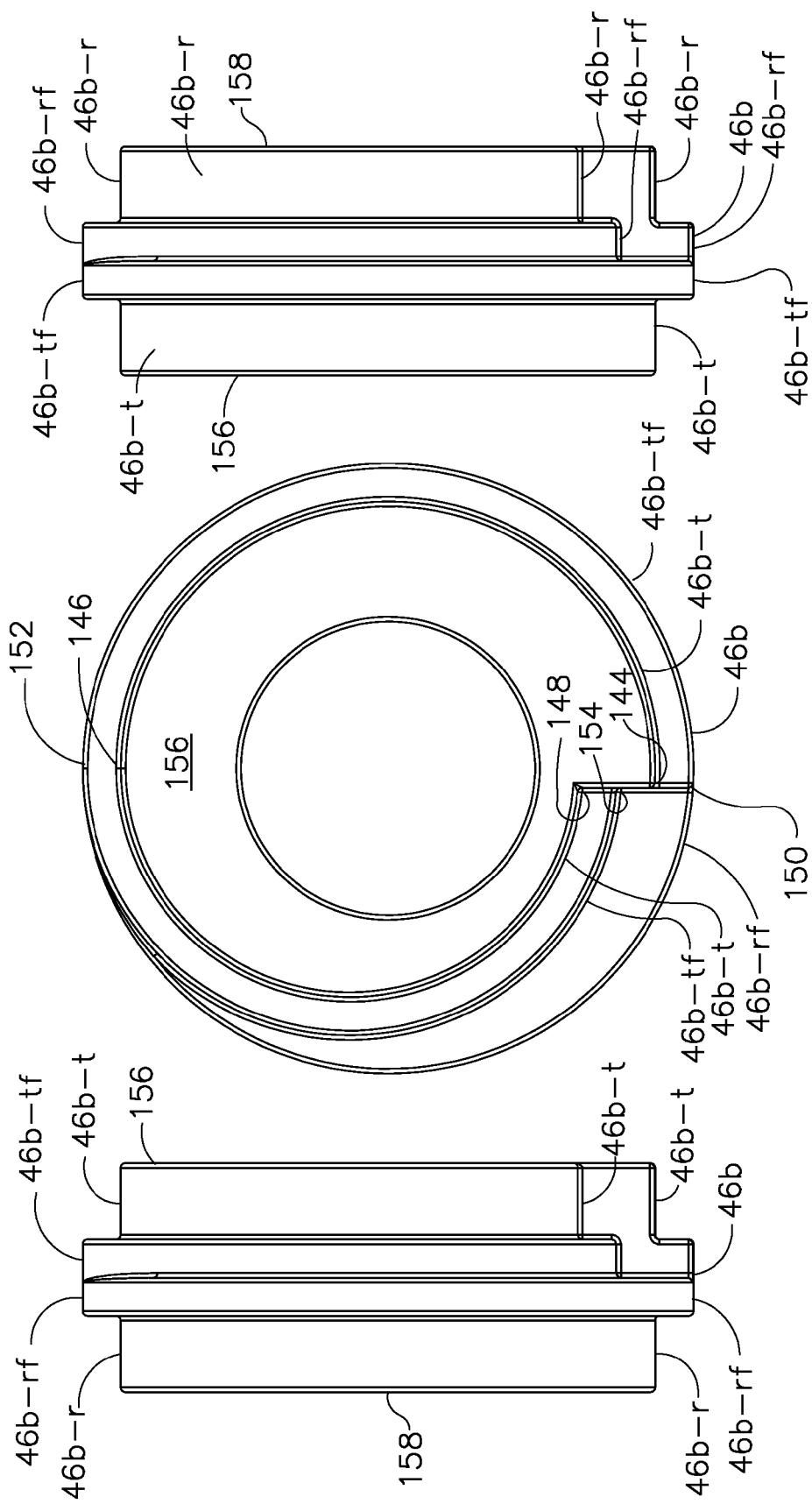

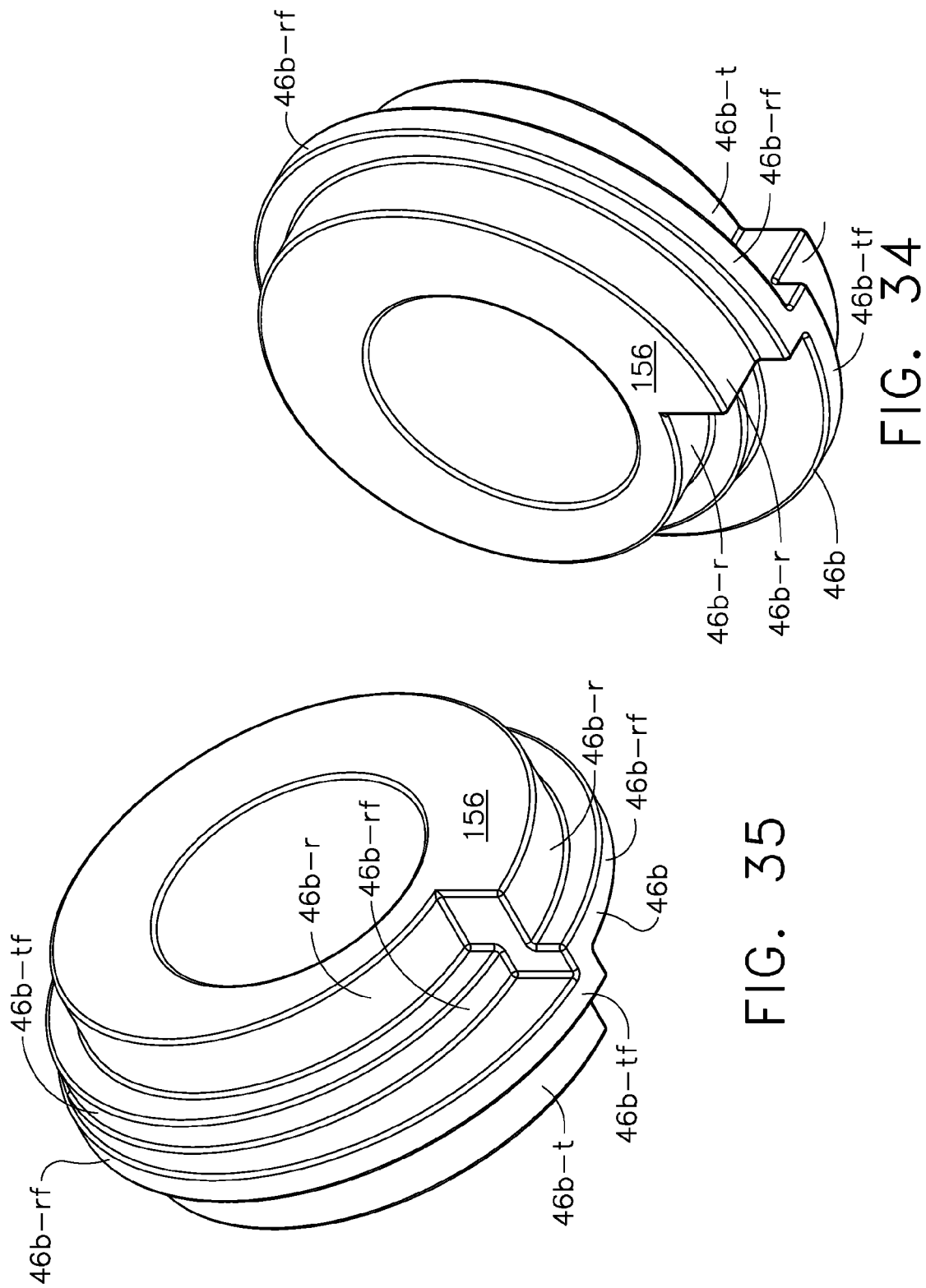

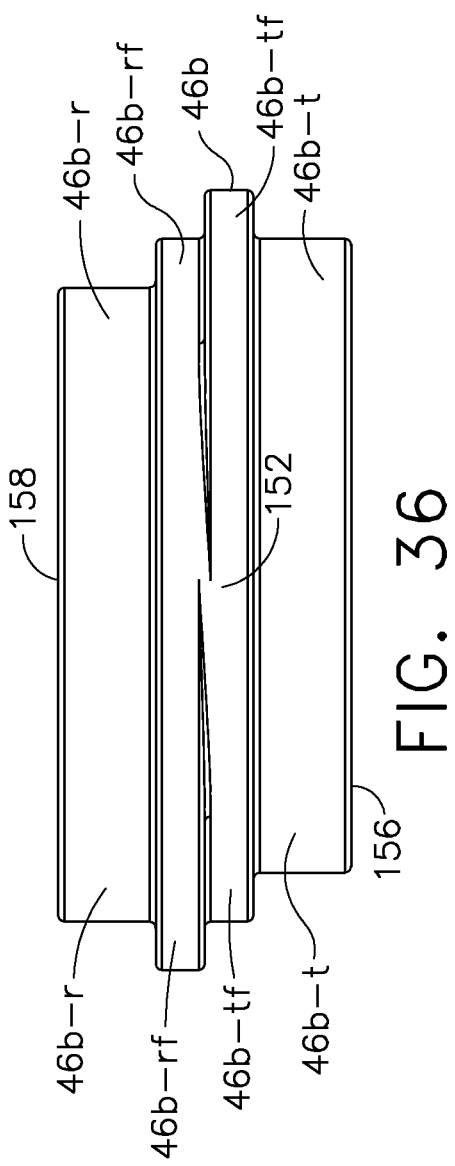
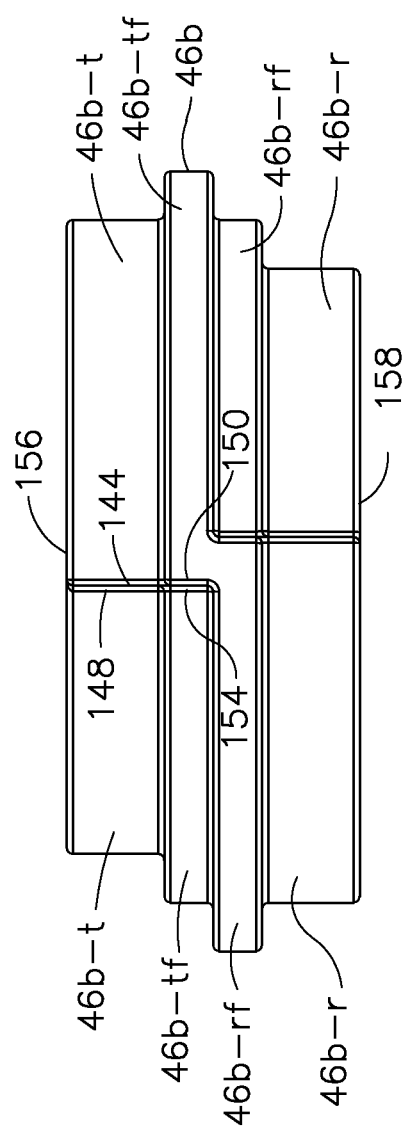

TRANSFER CONVEYOR

BACKGROUND

The present disclosure relates generally to material handling systems, and is more particularly directed to a material handling system and subsystems thereof having one or more transfer conveyor sections configured to selectively discharge articles being conveyed in at least one direction which is disposed at a transverse angle to the incoming direction of the article. The innovation will be disclosed in connection with, but not necessarily limited to, a transfer conveyor subsystem in which there are two conveying surfaces which are raised and lowered by a rotary actuator.

BRIEF DESCRIPTION OF THE DRAWINGS

The accompanying drawings illustrate embodiments of the invention, and, together with specification, including the detailed description which follows, serve to explain the principles of the present invention.

FIG. 13 is the same side view as FIG. 9 showing the conveying surfaces of the first conveying assembly and the second conveying assembly at substantially the same height.

FIG. 14 is an end view of the transfer conveyor with the end base frame omitted for clarity showing the conveying surfaces of the first conveying assembly and the second conveying assembly at substantially the same height as also shown in FIG. 13.

FIG. 20 is an end plan view of a first end of a cam.

FIG. 21 is a left side plan view of the cam shown in FIG. 20.

FIG. 22 is a right side plan view of the cam shown in FIG. 20.

FIG. 27 is a top plan view of the cam shown in FIG. 20.

FIG. 28 is a bottom plan view of the cam shown in FIG. 20.

FIG. 29 is an end plan view of a first end of another cam.

FIG. 30 is a left side plan view of the cam shown in FIG. 29.

FIG. 31 is a right side plan view of the cam shown in FIG. 29.

FIG. 34 is a perspective view of the opposite end of the cam shown in FIG. 29 from the lower right.

FIG. 35 is a perspective view of the opposite end of the cam shown in FIG. 29 from the lower left.

FIG. 36 is a top plan view of the cam shown in FIG. 29.

FIG. 37 is a bottom plan view of the cam shown in FIG. 29.

Figure 1:
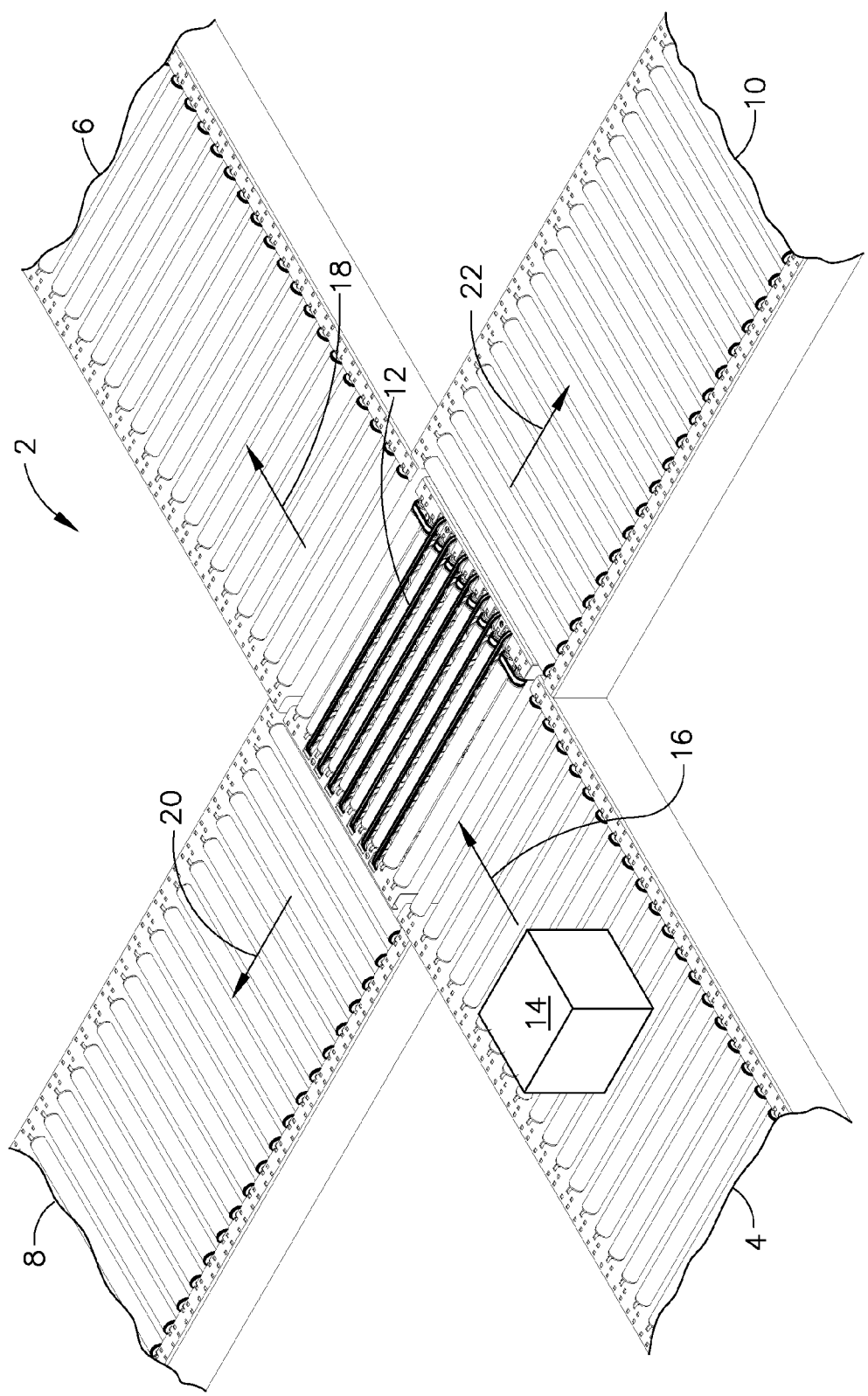
FIG. 1 is a perspective view of a conveyor subsystem having a transfer conveyor.
Figure 2:
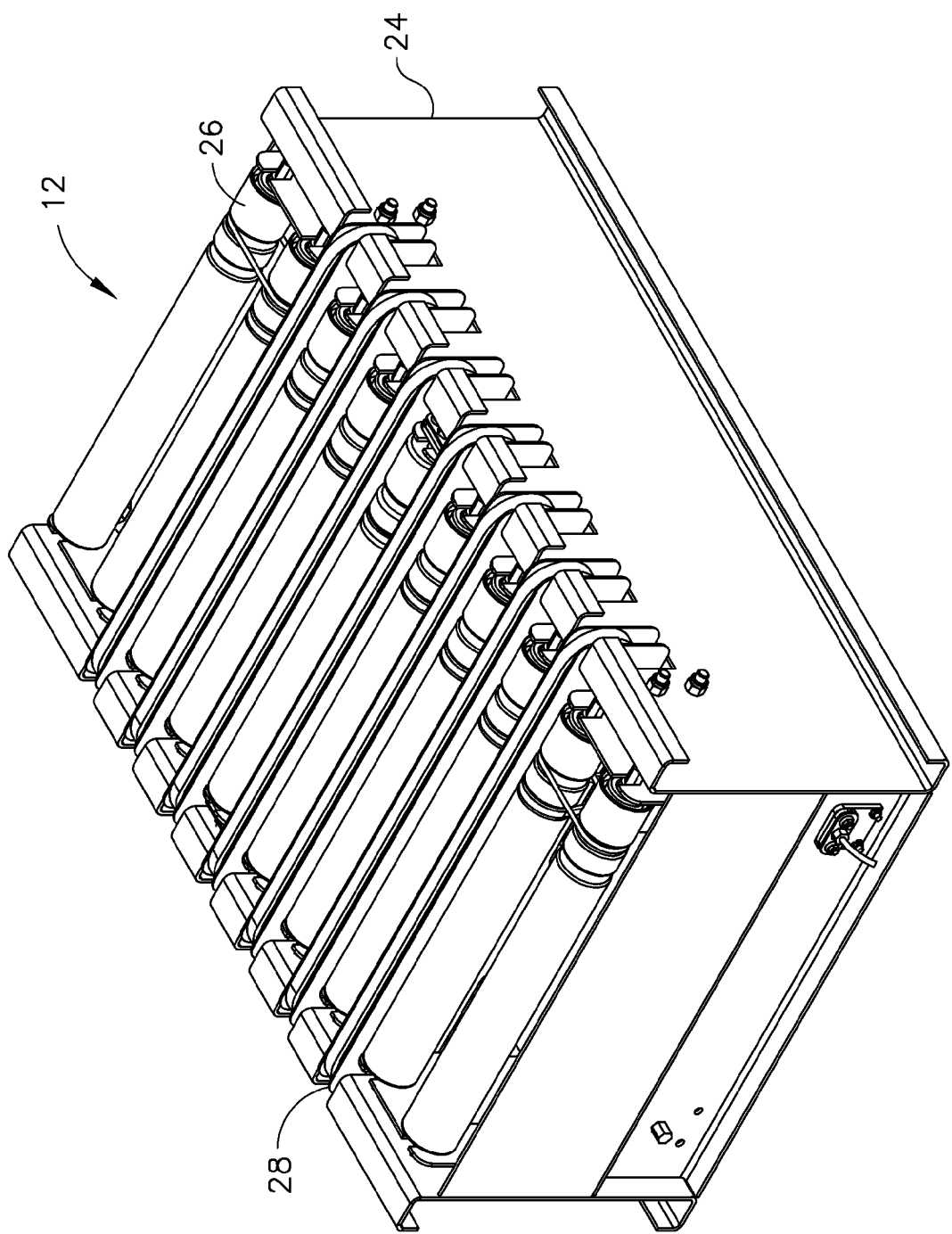
FIG. 2 is perspective view of a transfer conveyor constructed in accordance with the teachings of the present invention.
Figure 3:
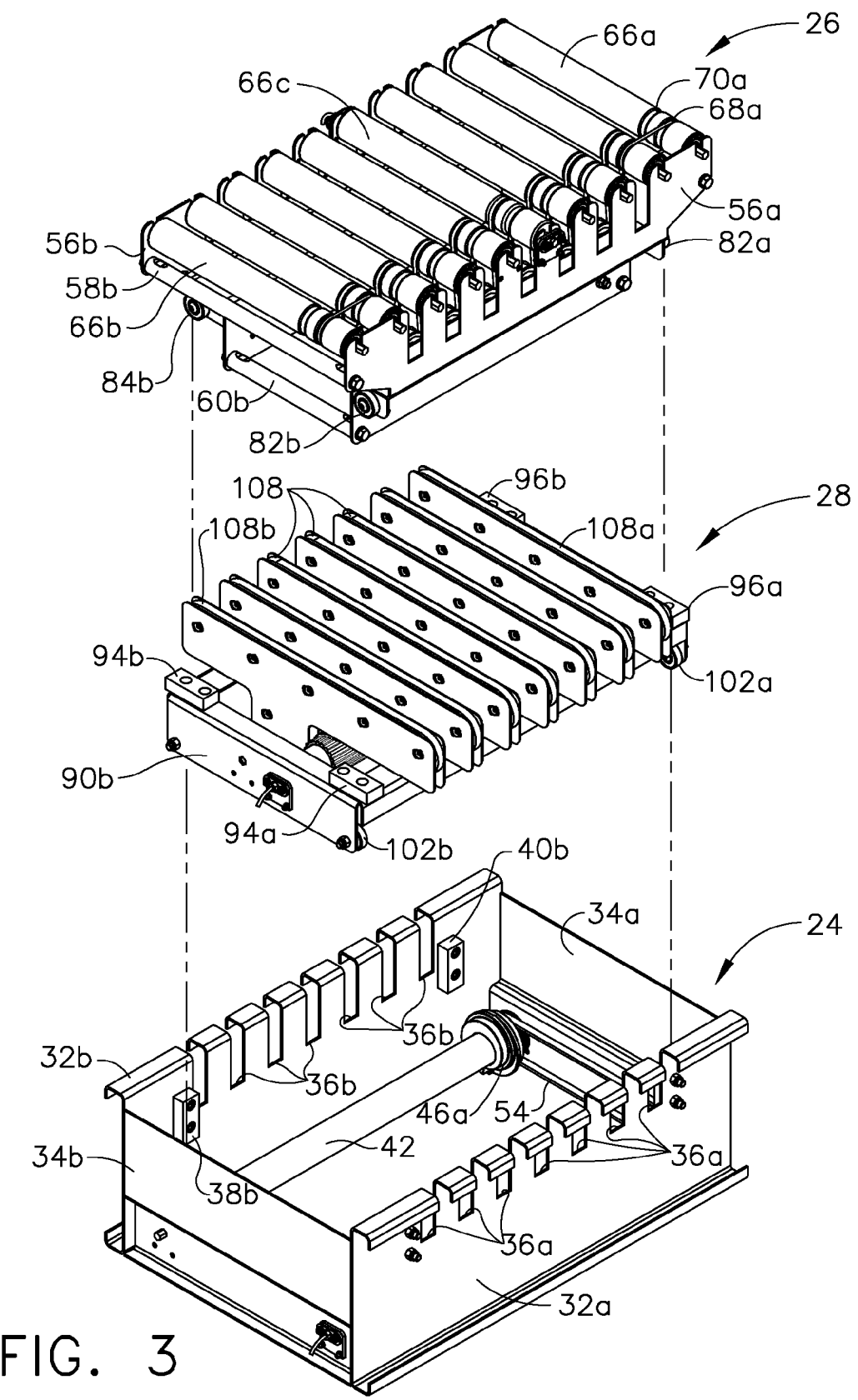
FIG. 3 is an exploded perspective view of the transfer conveyor of FIG. 2.
Figure 4:
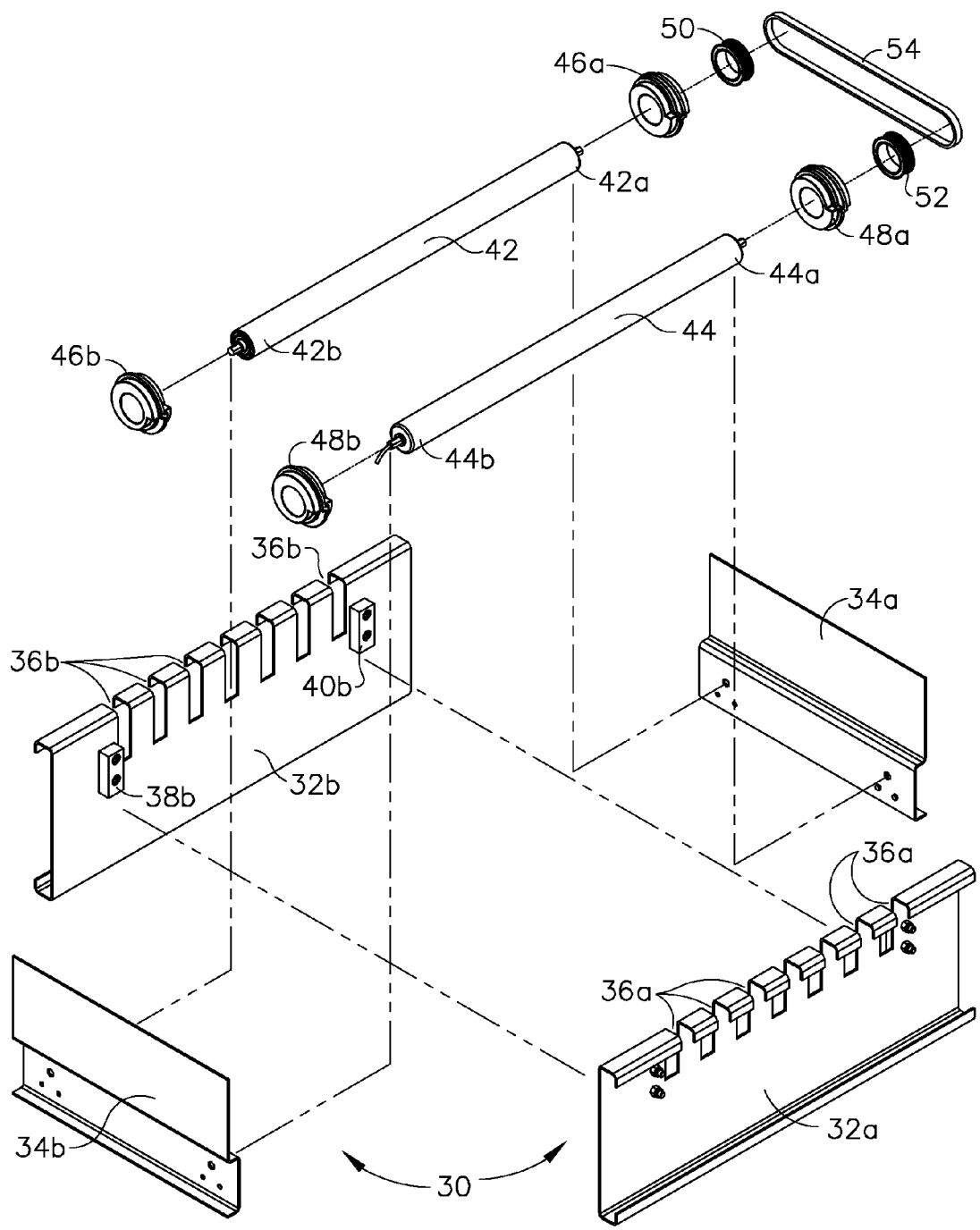
FIG. 4 is an exploded perspective view of the base assembly of the transfer conveyor of FIG. 2.

Reference will now be made in detail to one or more embodiments illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

Referring to FIG. 1, conveyor subsystem 2 includes a first pair of aligned conveyors 4 and 6 and a second pair of aligned conveyors 8 and 10. Transfer conveyor 12 is disposed at the intersection of conveyors 4, 6, 8 and 10. Each conveyor 4, 6, 8 and 10 define a respective conveying surface of that conveyor configured to convey an article 14 disposed thereon. In the embodiment depicted, transfer conveyor 12 is configured to direct articles which reach its conveying surface traveling in a first conveying direction, either direction, aligned with arrow 16. In the embodiment depicted, article 14 is illustrated as moving in the conveying direction of arrow 16, also referred to as the infeed direction, being discharged from conveyor 4 onto transfer conveyor 12, and configured to discharge article 14 on to conveyor 6 in the same first conveying direction, indicated by arrow 18. Transfer conveyor 12 is also configured to selectively discharge articles therefrom in a transverse conveying direction relative to the first direction. In the embodiment depicted, transfer conveyor 12 is configured to discharge articles in a second conveying direction, indicated by arrow 20, on to conveyor 8, or in a third conveying direction, indicated by arrow 22, on to conveyor 10. In the embodiment depicted, the transverse conveying direction is oriented generally perpendicular to the direction of arrows 16, 18, the infeed direction, but a transfer convey is not limited to the right angle configuration used herein to explain the teachings of the present invention.

As used herein, a transverse conveying direction is any direction which is not aligned with the infeed direction. It is noted that two transverse conveying directions, as illustrated in FIG. 1, are not required. A transfer conveyor constructed in accordance with the teachings of the present invention may be used in a subsystem having one or more transverse conveying directions. Additionally, it is noted that conveyor 6 may be omitted—transfer conveyor 12 may be used without a discharge direction aligned with the infeed direction: Conveyor subsystem 2 may be configured for transfer conveyor 12 to selectively discharge articles only in one or in more than one transverse conveying directions. When an article is discharged 90° from transfer conveyor 12 in either direction illustrated by arrows 20 and 22, the transfer is commonly referred to as a right angle transfer.

Additionally, either or both conveyors 8, 10, may feed an article onto transfer conveyor 12, in a direction aligned with but opposite arrows 20, 22, with transfer conveyor 12 discharging the article onto conveyor 4 or 6 (traveling in the appropriate direction for the discharge). This is a merge function, and when conveyors 4, 6 are at a 90° angle to conveyors 8, 10, it is commonly referred to as a right angle merge.

Referring to FIGS. 2-6, transfer conveyor 12 includes base assembly 24, first conveying assembly 26 and second assembly 28. Base assembly 24 includes base frame 30 comprising base frame sides 32a, 32b and base frame ends 34a, 34b, which are connected together, such as by bolting or welding, to form base frame 30. Base frame side 32a includes a plurality of spaced apart slots 36a which align with spaced apart slots 36b of base frame side 32b. Each base frame side 32a, 32b, includes a respective pair of spaced apart guides 38a, 40a (not seen) and 38b, 40b, made of any suitable material, such as UHMW polyethylene. Base assembly carries two spaced apart generally parallel rotary actuators 42, 44. In the embodiment depicted, actuators 42, 44 are illustrated as rollers and will also be referred to herein as roller 42 and roller 44, it being understood that rotary actuators 42, 44 are not limited to the roller illustrated. A pair of spaced apart cams 46a, 46b are carried by roller 42, rotating therewith. Similarly, a pair of spaced apart cams 48a, 48b are carried by roller 44, rotating therewith. The cam tracks (described below) of cams 46a and 48a are identical to and rotationally aligned with each other. The cam tracks (described below) of cams 46b and 48b are identical to and rotationally aligned with each other. The cam tracks (described below) of cams 46a, 48a have mirror image symmetry with cams 46b, 48b. Synchronizing drive pulleys 50, 52 are non-rotatably carried by rollers 42, 44, respectively at ends 42a, 44a. Synchronizing drive belt 54 extends between and around synchronizing drive pulleys 50, 52.

In the depicted embodiment, roller 44 is a motorized drive roller (MDR) which may be controlled to rotate in either direction through an total rotational angle consistent with the configuration of cams 46a, 46b, 48a, 48b, in the embodiment depicted, less than 360° of total rotation. Synchronizing drive belt 54 drives roller 42 without slippage to maintain the relative angular position between cams 46a, 46b and cams 48a, 48b. Synchronizing drive pulleys 50, 52, and synchronizing drive belt 54 may include features which resist or prevent slippage therebetween, such as external ridges or teeth on synchronizing drive pulleys 50, 52, and internal ridges or teeth on synchronizing drive belt 54. Any suitable drive mechanism may be used, disposed to synchronously raise and lower the conveying surfaces 120, 122 (see FIG. 9) of first conveying assembly 26 and second conveying assembly 28, respectively, which is effected in the embodiment depicted through rotation of cams 46a, 46b, 48a, 48b. For example, synchronizing belt 54 and synchronizing pulleys 50, 52, may be omitted by configuring drive roller 42 as an MDR, and controlling it so as to synchronize the relative angular positions of cams 46,a, 46b, 48a, 48b.

Figure 5:
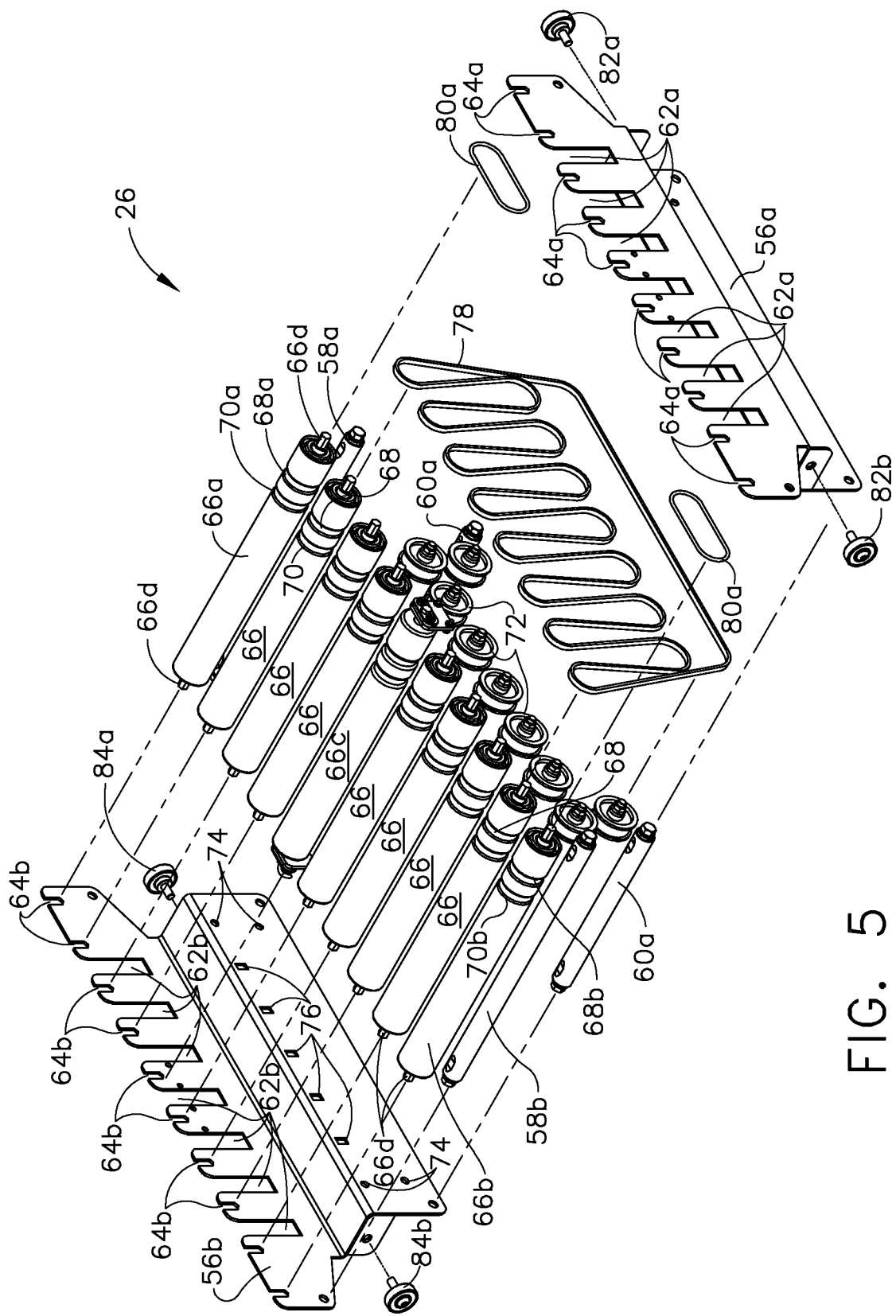
FIG. 5 is an exploded perspective view of the first conveying assembly of the transfer conveyor of FIG. 2.

As illustrated in FIG. 5, first conveying assembly 26 includes side frames 56a, 56b which are secured to each other in a spaced apart relationship by end frames 58a, 60a, 58b, 60b. Side frame 56a includes a plurality of spaced apart slots 62a which align with spaced apart slots 62b of side frame 56b. Side frame 56a includes a plurality of spaced apart slots 64a which align with spaced apart slots 64b of side frame 56b.

First conveying assembly 26 comprises a plurality of spaced apart conveying elements, illustrated as rotatable rollers 66, having respective axels 66d which may be disposed into respective slots 64a, 64b. The upper tangent edges of rollers 66 define the conveying surface of first conveying assembly 26. Axles 66d may be spring loaded and capable of being depressed into rollers 66, or may be fixed.

In the embodiment depicted, rollers 66 are powered, driven by a single MDR roller 66c which may be disposed near the middle of first conveying assembly 26. In the embodiment depicted, each roller 66 includes a respective pair of spaced apart annular grooves 68, 70, which are generally aligned. Aligned with groves 70 is a plurality of rotatable idler pulleys 72 which are attached to side frame 56a by fasteners engaging holes 74 and vertical slots 76. Although holes 74 and vertical slots 76 of side frame 56a are not visible, reference is made to the corresponding numbered features of side frame 56b, which because of commonality of components is identical to side frame 56a. Vertical slots 76 allow the position of those idler pulleys to be adjusted vertically.

Drive belt 78 is circuitously routed in a serpentine path engaging each roller 66 in grooves 70 and each idler pulley 72. Vertical adjustment of each idler pulley 72 allows tension and slack in drive belt 78 to be adjusted. In the embodiment depicted, drive belt 78 is a flat belt, accommodating the reverse bending around rollers 66 and idler pulleys 72. Because grooves in rollers typically have a rounded profile, a band (not shown) may be disposed in each groove 70 to present a crowned profile more suitable for flat drive belt 78. In the embodiment depicted, rollers 66a and 66b are driven by but not directly engaged by drive belt 78. Roller 66a is driven by the adjacent roller 66 through drive element 80a disposed in grooves 68a, 68 of the respective rollers 66, 66a. Similarly, roller 66b is driven by its adjacent roller 66 through drive element 80b disposed in groves 68b, 68 of the respective rollers 66, 66b. Drive elements 80a, 80b may be O-belts, as is known. Although in the embodiment depicted, all rollers 66 are driven, the practice of the present invention is not so limited. One or more rollers 66 may be non driven idler rollers. Additionally, the present invention is not limited to the use of a MDR to drive rollers 66. Any suitable drive configuration and mechanism may be used a as the source of rotational power to drive rollers 66, which may or may not move vertically with first conveying assembly 26.

Transfer conveyor 12 would typically be oriented such that conveying direction of rollers 66 is in alignment with the primary infeed direction, arrow 16 in FIG. 1. Thusly, roller 66c would be configured to drive rollers 66 to advance articles in the downstream conveying direction in the direction of arrows 16 and 18. Rollers 66 could be configured to rotate in either direction, such as in a configuration in which transfer conveyor 12 is oriented in such that the conveying direction of rollers 66 is transverse to the primary infeed direction.

First conveying assembly 26 is vertically moveably supported by two pairs of spaced apart rotatable cam followers 82a, 82b and 84a, 84b, respectively carried by side frames 56a, 56b. Cam followers 82a, 82b, 84a, 84b are in engagement with cams 46a, 46b, 48a, 48b in a manner which will be described below. Alternately, cam followers 82a, 82b and 84a, 84b may be configured not to rotate, such as being configured to slide along the cam tracks described below.

Figure 6:
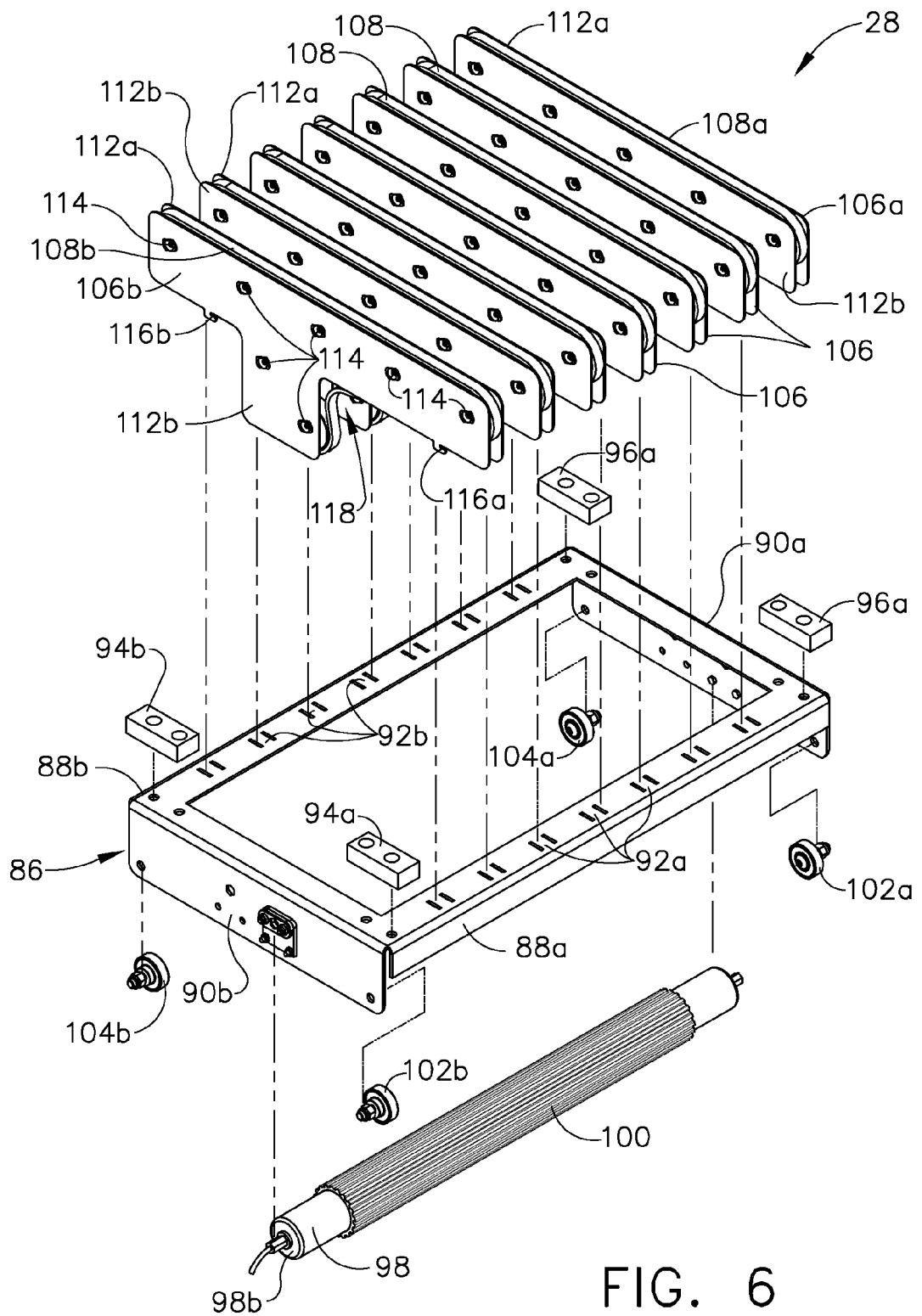
FIG. 6 is an exploded perspective view of the second conveying assembly of the transfer conveyor of FIG. 2.

Referring to FIG. 6, second conveying assembly 28 includes frame 86 having spaced apart side frame portions 88a, 88b and spaced apart end frame portions 90a, 90b. Side frame portion 88a includes a plurality of spaced apart pairs of slots 92a which align with spaced apart pairs of slots 92b of side frame portion 88b. Frame 86 carries two spaced apart pairs of spaced apart guides 94a, 94b and 96a, 96b. In the embodiment depicted, guides 94a, 94b, 96a, 96b are respectively carried by the horizontal portion of frame 86 proximal to the corners formed by side frame portions 88a, 88b and end frame portions 90a, 90b. Alternately, guides 94a, 94b, 96a, 96b could be respectively carried on the vertical flanges of end frame portions 90a, 90b. Guides 94a, 94b, 96a, 96b extend past the edge of side frame portions 88a, 88b, respectively, and may be adjustable outwardly/inwardly. Guides 94a, 94b, 96a, 96b may be made of any suitable material, such as UHMW polyethylene.

Second conveying assembly 28 includes a drive element, illustrated as roller 98, rotatably supported at each end by end frame portions 90a, 90b. In the embodiment depicted, drive roller 98 is a MDR. Drive roller 98 includes sleeve 100 having a plurality of external teeth or ribs, configured to positively engage and drive belts 108 as described below. In the embodiment depicted, sleeve 100 is an aluminum extrusion affixed to drive roller 98. The present invention is not limited to the use of an MDR with second conveying assembly 28. Any suitable drive configuration and mechanism may be used, which may or may not move vertically with second conveying assembly 28.

Second conveying assembly 28 is vertically moveably supported by two pairs of spaced apart rotatable cam followers 102a, 102b and 104a, 104b, respectively carried by end frame portions 90a, 90b. Cam followers 102a, 102b, 104a, 104b are in engagement with cams 46a, 46b, 48a, 48b in a manner which will be described below.

Second conveying assembly 28 includes a plurality of spaced apart cartridges 106 which comprise respective conveying elements, illustrated as belts 108 supported by a plurality of rotatable pulleys 110 (see FIG. 8) respectively carried by assembly frames 112a, 112b, held together by fasteners 114, which define the axes of rotation for rotatable pulleys 110. Each assembly frame 112a, 112b, includes a pair of spaced apart tabs 116a, 116b which, during assembly, may be inserted into engagement with respective slots 92a, 92b. To retain tabs 116a, 116b in slots 92a, 92b, a retainer (not shown) may be disposed adjacent cartridges 106, secured to frame 86 so as to prevent tabs 116b from being disengaged from slots 92a, 92b. The upper runs of belts 108 collectively define the conveying surface 122 of second conveying assembly 28.

Cartridges 106 are interposed between rollers 66, and may be individually removed or inserted into second conveying assembly 28 while rollers 66 are in place, by accessing the retainer from above, moving the retainer away, and withdrawing the cartridge 106. Drive roller 98 externally engages belts 108. In the embodiment depicted, drive roller positively engages belts 108 in the area indicated at 118 through external teeth on belts 108. Belts 108 may be driven using any suitable configuration. For example, belts 108 may have a non-toothed exterior surface and frictionally engage drive roller 98. This external engagement between cartridges 106 and drive roller 98 permits cartridges 106 to be removed or inserted without removal, disassembly or adjustment of drive roller 98.

Transfer conveyor 12 would typically be oriented such that conveying direction of travel of belts 108 is in alignment with second direction arrow 20 or third direction arrow 22. Drive roller 98 is configured to rotate in either direction so as to drive belts 108 to receive articles from conveyor 8 or 10 or to discharge articles from transfer conveyor 12 onto conveyor 8, in either direction aligned with arrow 20, or to discharge articles onto conveyor 10 in the direction of arrow 22.

Figure 8:
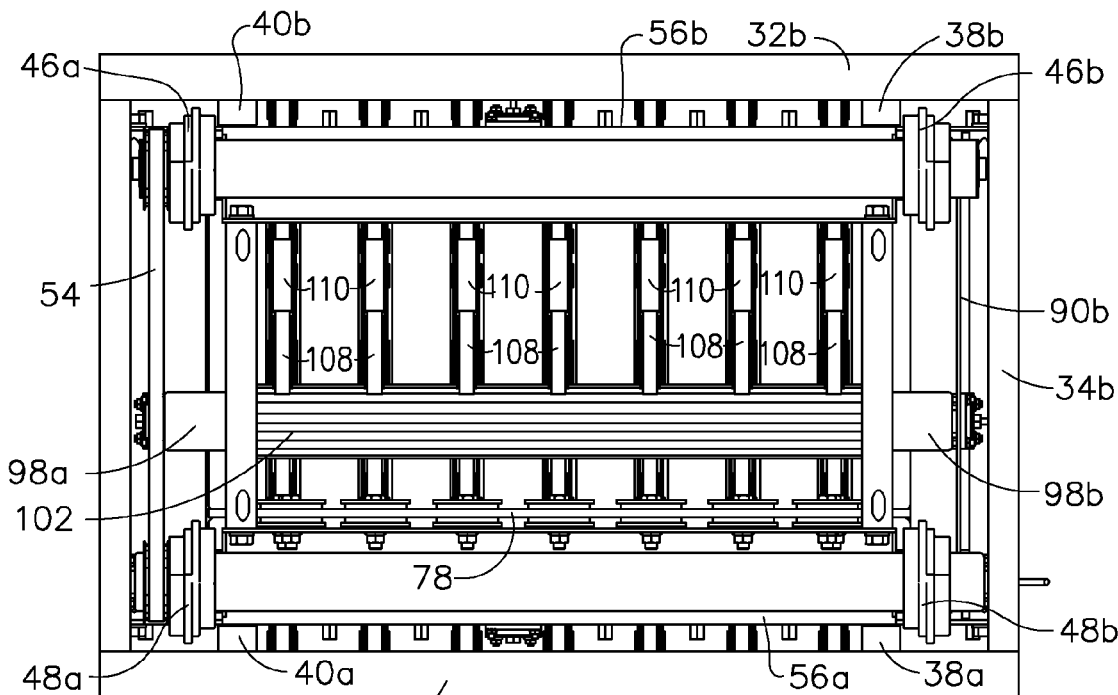
FIG. 8 is a bottom plan view of the transfer conveyor of FIG. 2.
Figure 7:
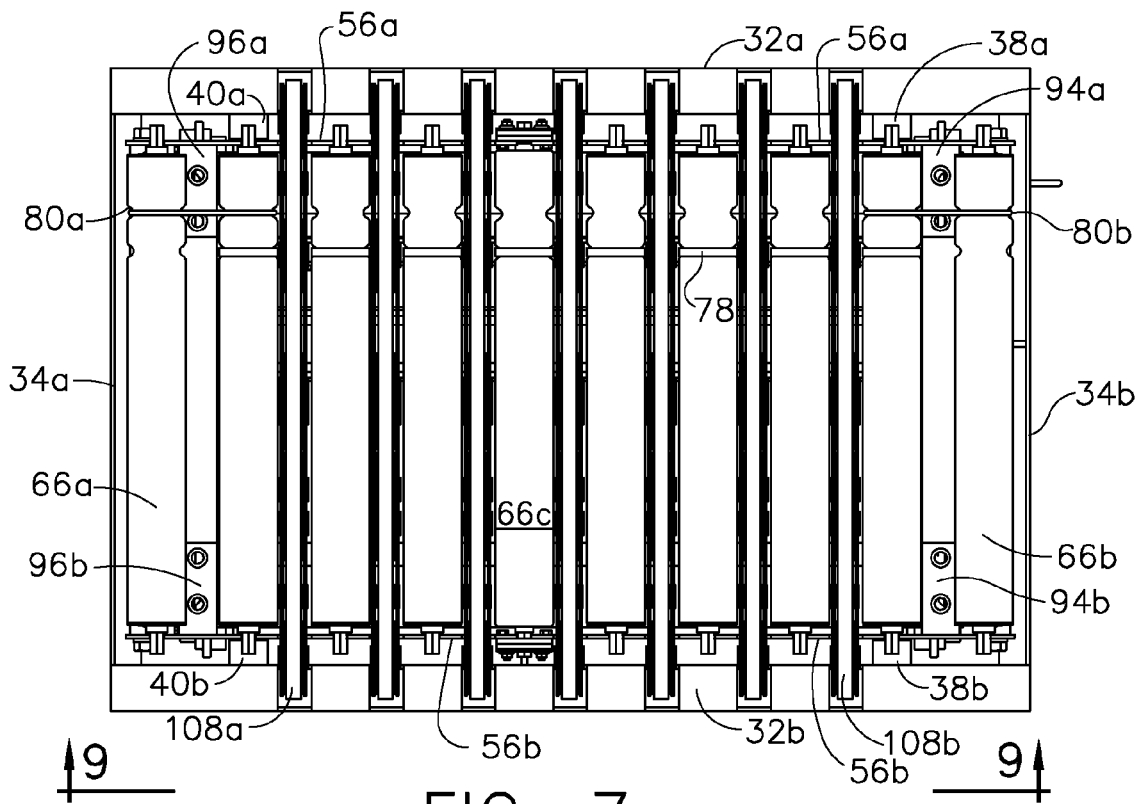
FIG. 7 is a top plan view of the transfer conveyor of FIG. 2.

The top and bottom of transfer conveyor 12 are presented in FIGS. 7 and 8, illustrating the arrangement of base assembly 24, first conveying assembly 26 and second conveying assembly 28. Guides 38a, 40a are disposed between base frame side 32a and side frame 56a, and guides 38b, 40b are disposed between base frame side 32b and side frame 56b, functioning to locate first conveying assembly 26 relative to base frame sides 32a, 32b and allow the vertical movement effected by cams 46a, 46b, 48a, 48b, as described below. Guides 94a, 96a extend between frame 86 and side frame 56a, and guides 94b, 96b extend between frame 86 and side frame 56b, functioning to locate second conveying assembly 28 relative to side frames 56a, 56b and allow the vertical movement effected by cams 46a, 46b, 48a, 48b, as described below.

Figure 9:
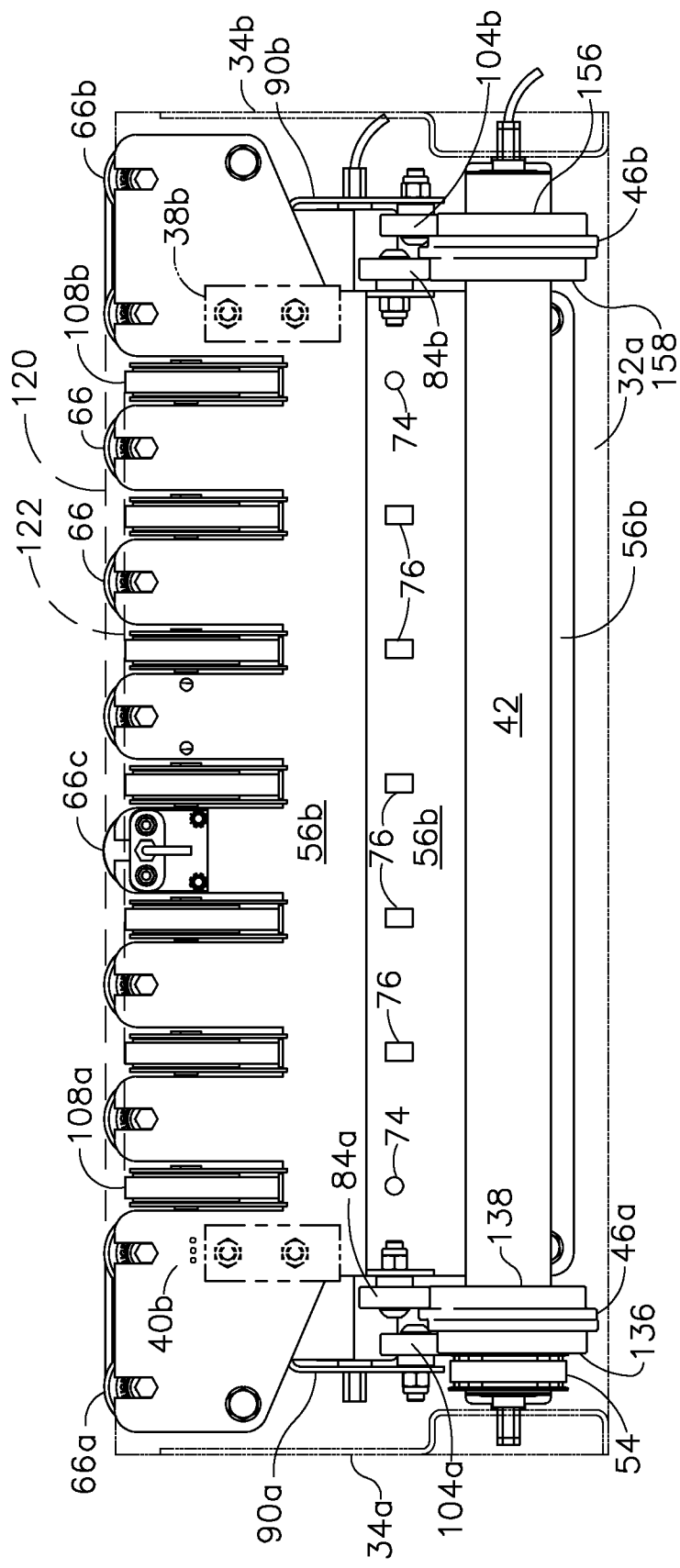
FIG. 9 is a side view of the transfer conveyor of FIG. 2 in the direction of line 9-9 of FIG. 7, the side base frame omitted for clarity showing the conveying surface of the second conveying assembly at a retracted position.
Figure 10:
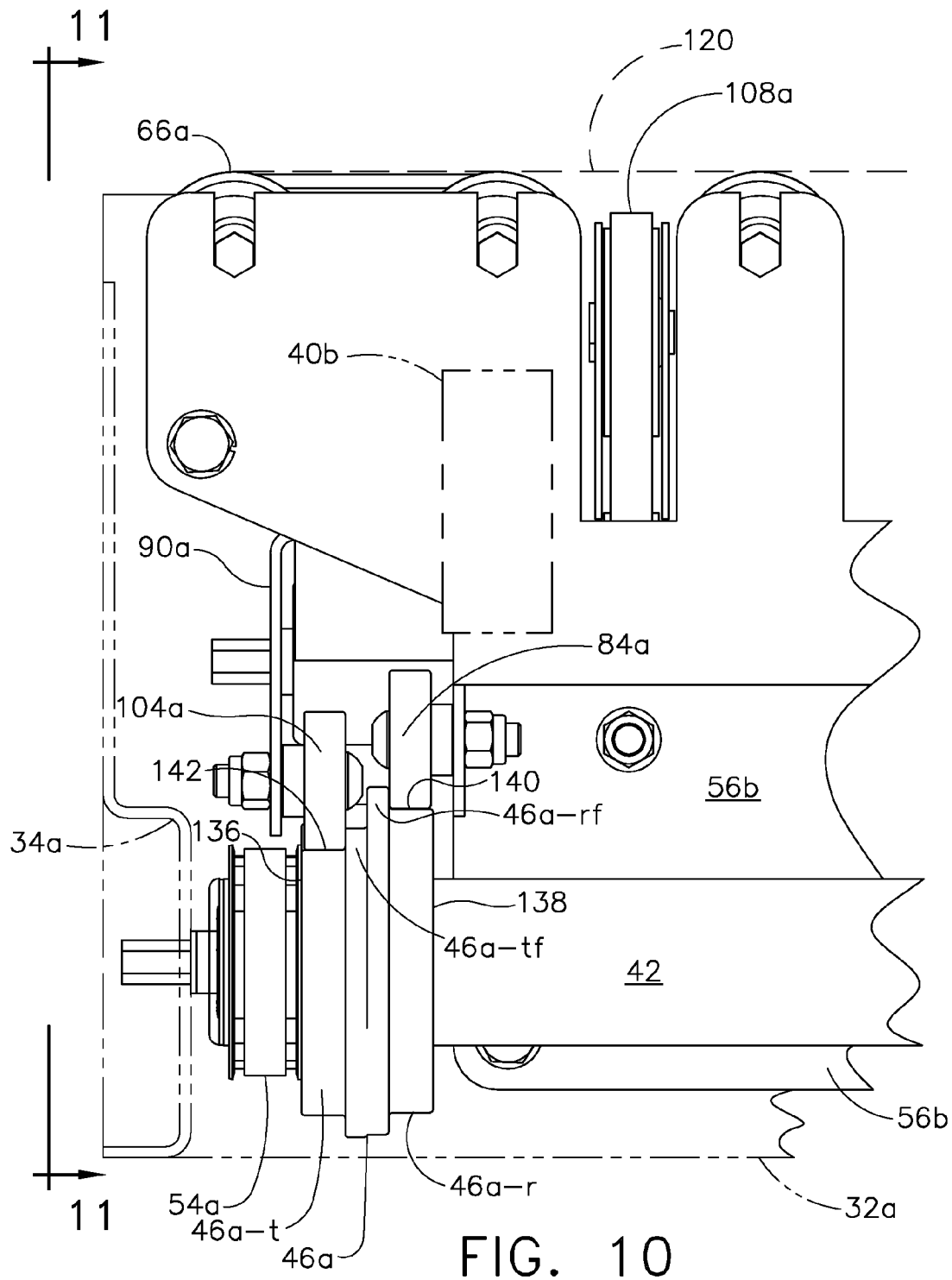
FIG. 10 is an enlarged fragmentary side view of the left end of FIG. 9.
Figure 11:
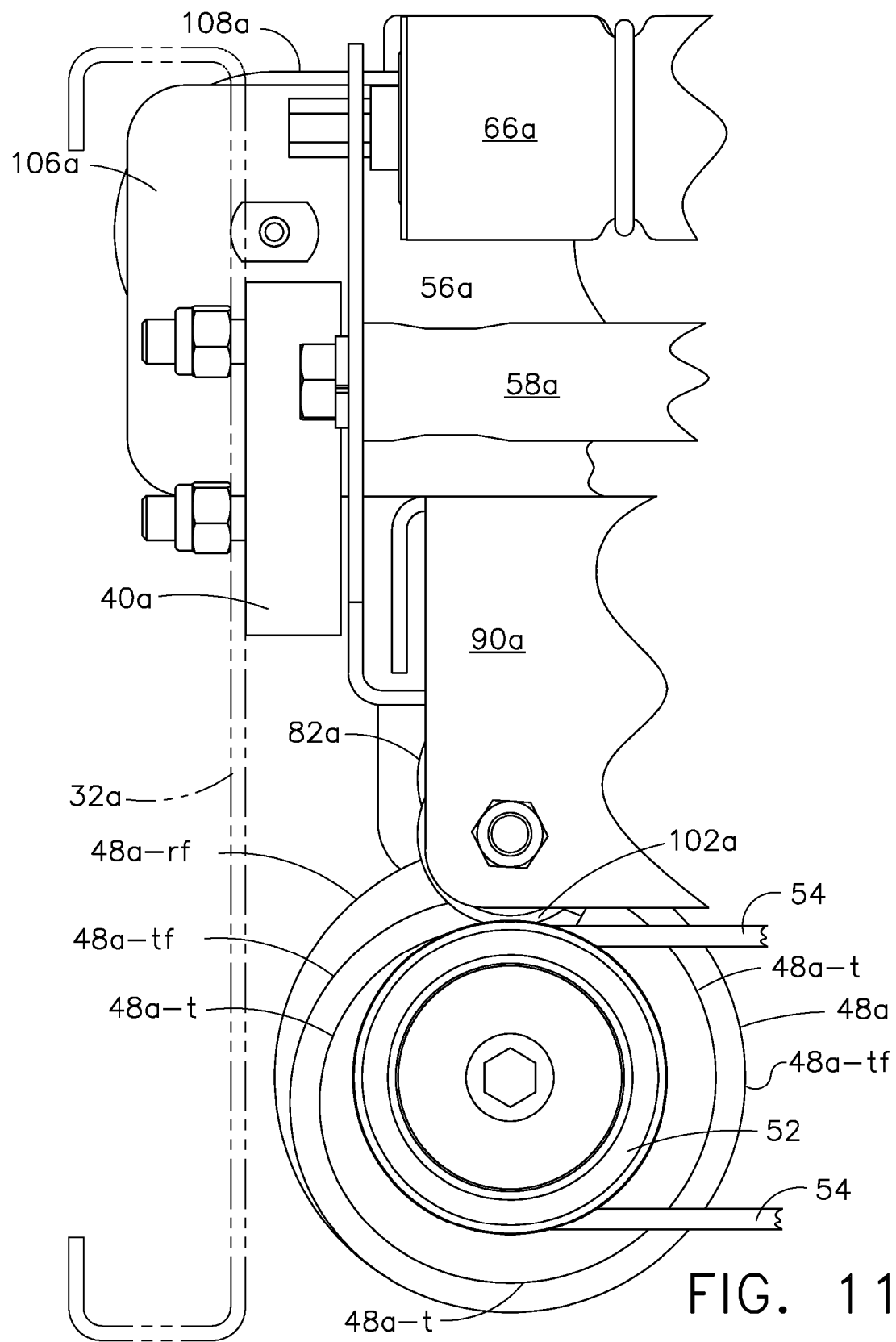
FIG. 11 is an enlarged fragmentary end view taken in the direction of line 11-11 of FIG. 10.
Figure 12:
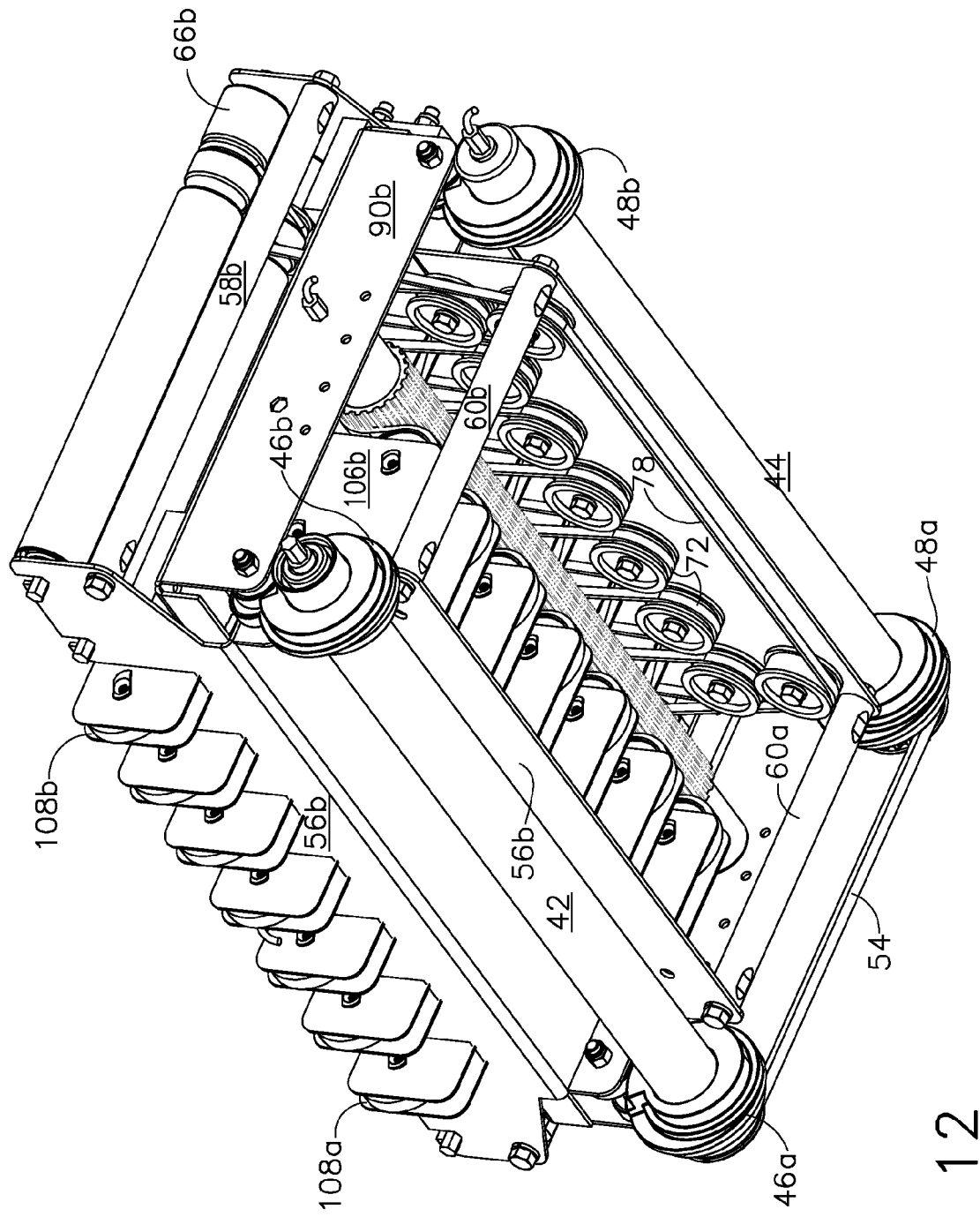
FIG. 12 is a perspective view from the bottom of the transfer conveyor of FIG. 2 with an end base frame and a side base frame omitted for clarity, showing the cams oriented to locate the conveying surface of the second conveying assembly a retracted position.

First conveying assembly 26 and second conveying assembly 28 are vertically movable, making their respective conveying surfaces vertically moveable. The vertical movements of first conveying assembly 26 and second conveying assembly 28 is effected by rotation of rotatable cams 46a, 46b, 48a, 48b. Referring to FIGS. 9-11, conveying surface 120 of first conveying assembly 26 is disposed at its conveying height —the height at which it is disposed when conveying articles. In the embodiment depicted, it is the maximum height at which conveying surface 120 can be disposed, which substantially matches the height of the conveying surfaces of conveyors 4, 6, 8 and 10. Conveying surface 122 of second conveying assembly 28 is disposed below the height of conveying surface 120, at its lowest height, at which it will not make substantive contact with articles on conveying surface 120. For these positions of conveying surfaces 120, 122, articles may be conveyed in the conveying direction of rollers 66, either direction aligned with arrow 16.

Referring to FIGS. 9 - 12 and FIGS. 20 - 27, which illustrate the configuration of cam 46a from different angles, the interaction of cam 46a and cam followers 84a and 104a can be seen. The engagement between and function of cams 46b, 48a, 48b with respective cam followers 82a, 82b, 84b, 102a, 102b and 104b are the same, taking into account the minor image symmetry between cams 46a and 46b and cams 48a and 48b. Cam 46a includes circumferential first conveying assembly cam track 46a-r and circumferential second conveying assembly cam track 46a-t disposed on opposite sides of cam 46a. Interposed between cam track 46a-r and 46a-t, are respective flanges 46a-rf and 46a-tf. As seen in FIGS. 20-22, cam track 46a-t extends circumferentially about cam 46*a* having a generally constant radius from point 124 to point 126, and has a decreasing radius from point 126 to point 128. Similarly, flange 46*a-tf* extends circumferentially about cam 46*a* having a generally constant radius from point 130 to point 132, and has a decreasing radius from point 132 to point 134. The difference in corresponding radii between cam track 46*a-t* and associated flange 46*a-tf* provides clearance for the head of the fastener holding cam follower 84*a* to side frame 56*b*. As seen in FIG. 10, second conveying assembly cam track 46*a-t* is on side 136 of cam 46*a* and first conveying assembly cam track 46*a-r* is on side 138 of cam 46*a*. Flange 46*a-rf* and the corresponding flange on cam 46*b*, flange 46*b-rf*, cooperate to maintain cam followers 84*a* and 84*b* therebetween, limiting the horizontal movement of first conveying assembly 26. It is noted that cam 48*a* is identical to cam 46*a*. FIG. 11 illustrates cam 48*a* and its relationship with cam followers 82*a*, 102*a* matching the relationship of cam 46*a* with cam followers 84*a*, 104*a* shown in FIG. 10.

Roller 42, which functions with drive roller 44 as an actuator to effect the positioning of conveying surfaces 120, 122, is disposed at an angular position in FIGS. 9-12 at which cam 46*a* (and concomitantly cams 46*b*, 48*a* and 48*b*) is oriented so as to position conveying surface 120 at its conveying height and position conveying surface 122 at a retracted height. In FIG. 10, the radius of first conveying assembly cam track 46*a-r* adjacent cam follower 84*a* at 140 is at its maximum and the radius of second conveying assembly cam track 46*a-t* adjacent cam follower 104*a* at 142 is at its minimum. FIG. 11 shows an end view of cam 48*a*, which is in the same angular orientation as cam 46*a* as a result of the synchronized motion therebetween. Cam follower 102*a* is adjacent second conveying assembly cam track 48*a-t*, at its minimum radius.

Figure 15:
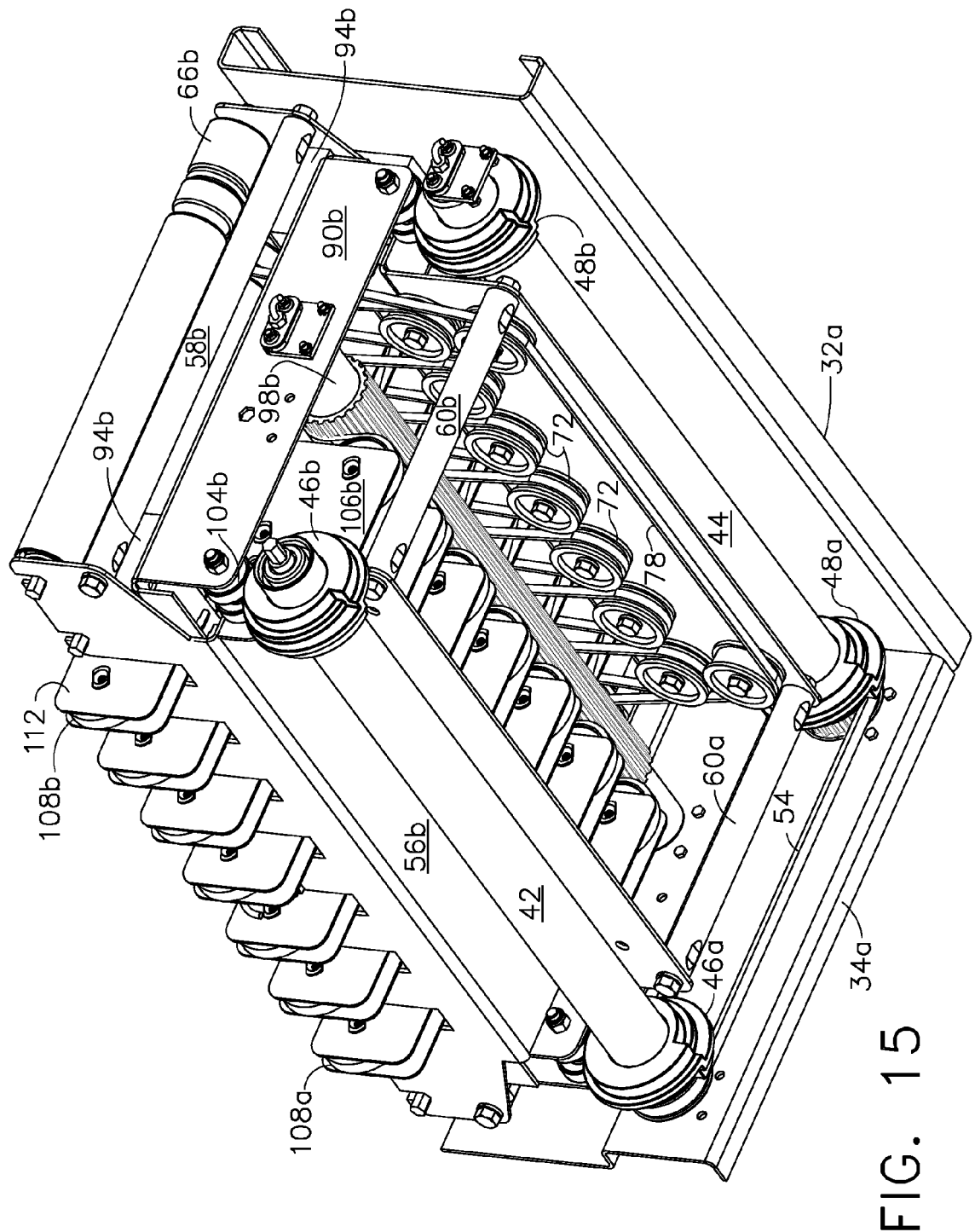
FIG. 15 is a perspective view from the bottom of the transfer conveyor of FIG. 2 with an end base frame and a side base frame omitted for clarity, showing the cams oriented to locate the conveying surfaces of the first conveying assembly and the second conveying assembly at substantially the same height.

In FIGS. 13-15, cams 46*a*, 46*b*, 48*a*, 48*b* are disposed at an intermediate position, the midpoint of the their range of angular rotation. The radii of first conveying assembly cam tracks 46*a-r*, 46*b-r*, 48*a-r*, 48*b-r* adjacent cam followers 82*a*, 82*b*, 84*a*, 84*b* are at their maximum and the radii of second conveying assembly cam tracks 46*a-t*, 46*b-t*, 48*a-t*, 48*b-t* adjacent cam followers 102*a*, 102*b*, 104*a*, 104*b* are at their maximum. This locates both conveying surface 120 at its conveying height and conveying surface 122 its conveying heights, co-incident with each other.

Alternatively, the conveying height of conveying surface 122 could be set to be slightly below the conveying height of conveying surface 120, with second conveying assembly cam track 46*a-t*, 46*b-t*, 48*a-t*, 48*b-t* could be correspondingly configured, such that as first conveying assembly 26 is lowered through rotation of cams 46*a*, 46*b*, 48*a*, 48*b*, articles on first conveying surface 120 are slightly lowered on to conveying surface 122 to be discharged by second conveying assembly 28.

Figure 16:
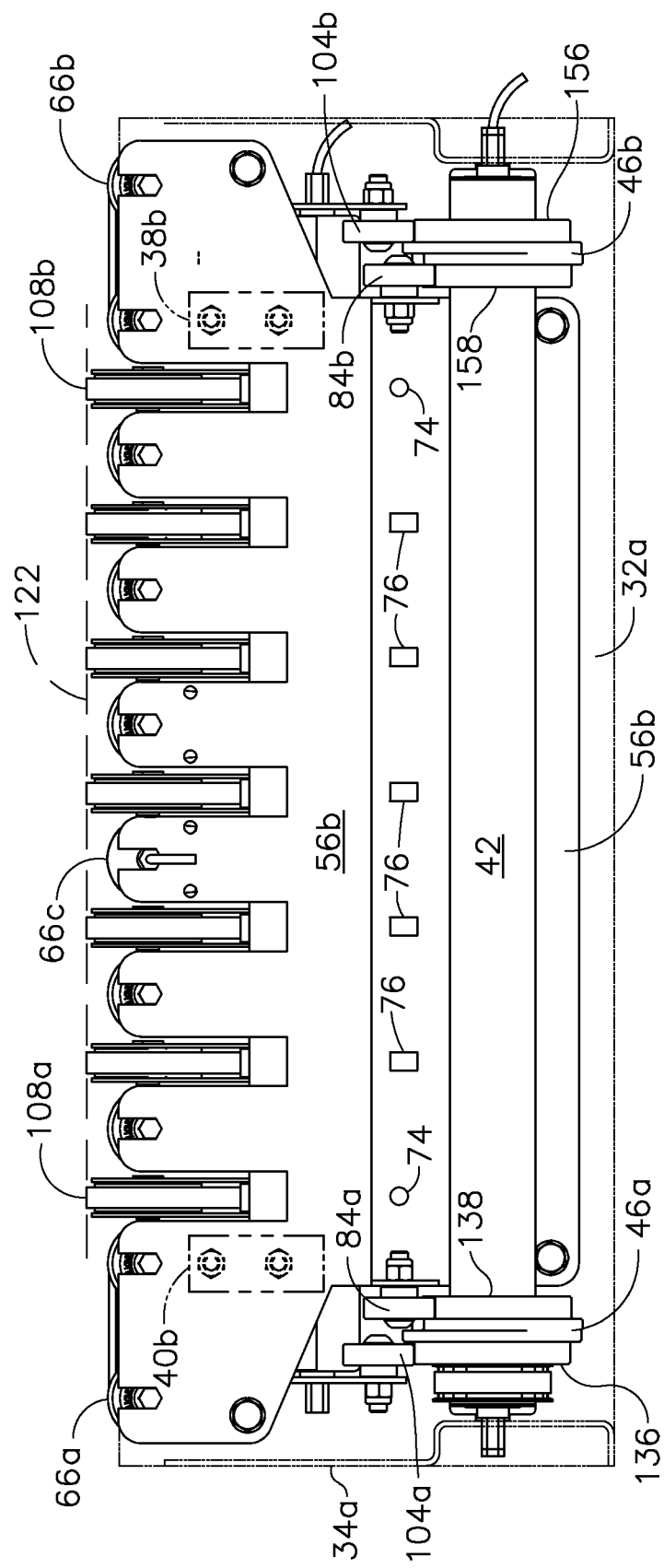
FIG. 16 is the same side view as FIG. 9 showing the conveying surface of the first conveying assembly at a lowered position.
Figure 17:
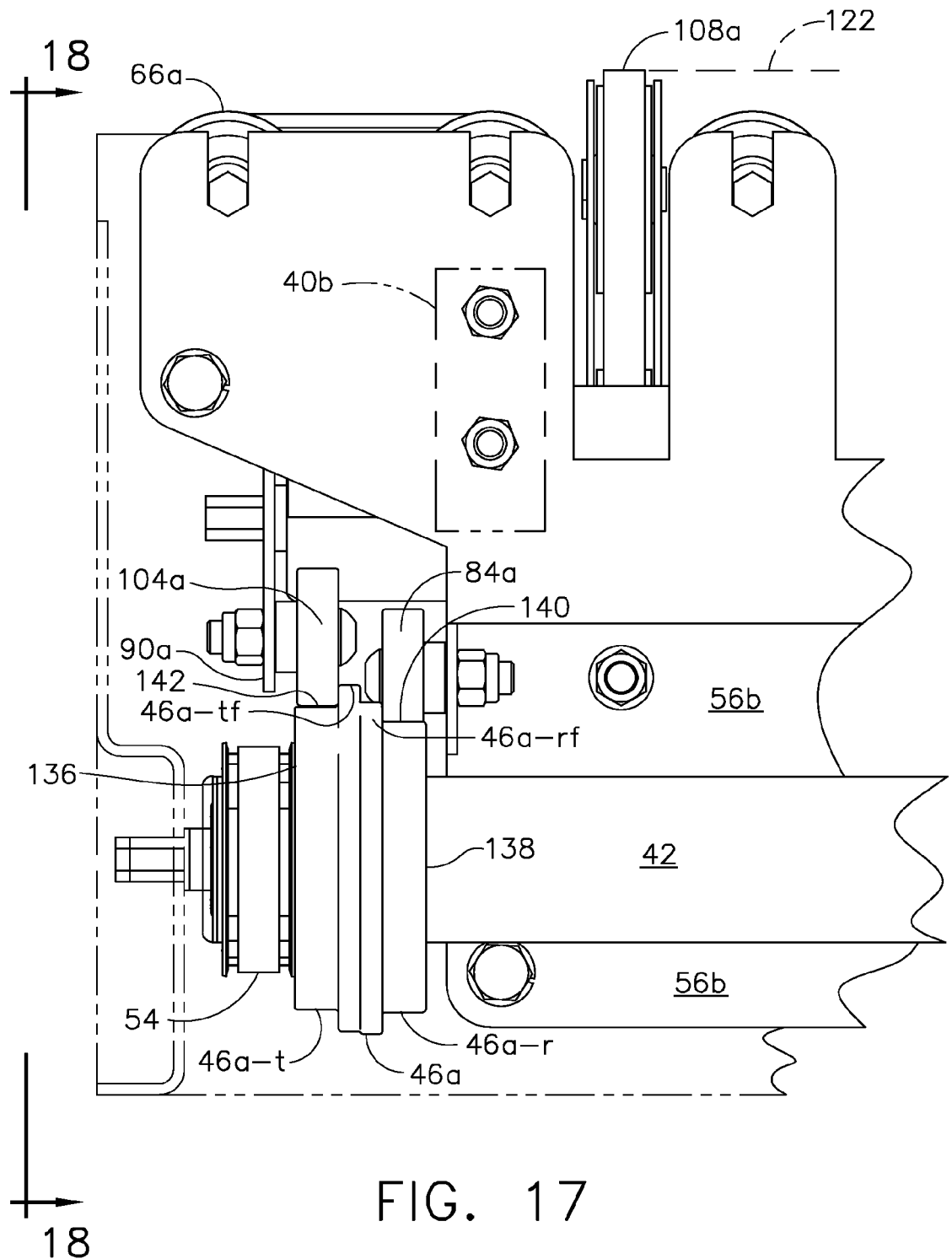
FIG. 17 is an enlarged fragmentary side view of the left end of FIG. 16.
Figure 18:
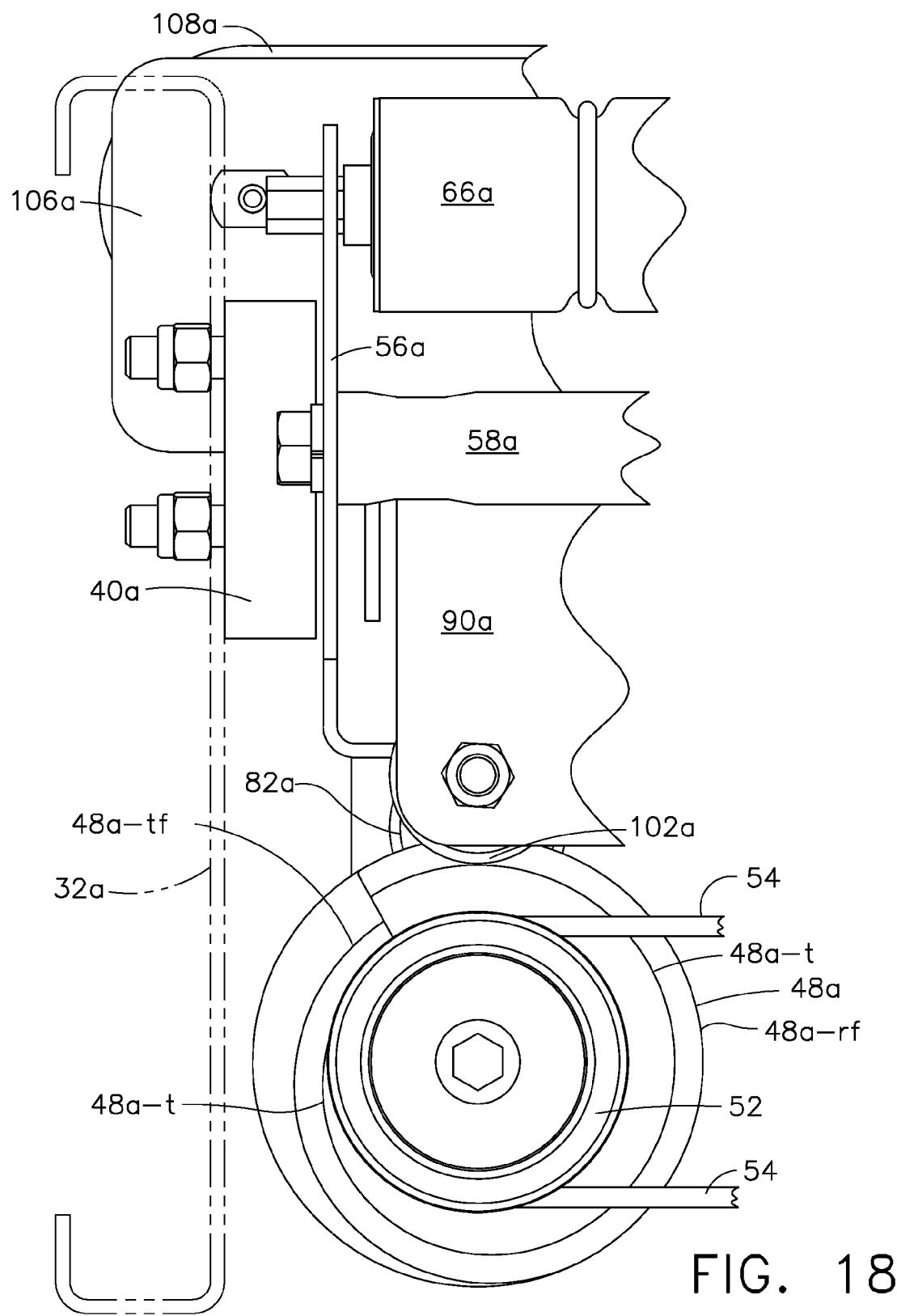
FIG. 18 is an enlarged fragmentary end view taken in the direction of line 18-18 of FIG. 17.
Figure 19:
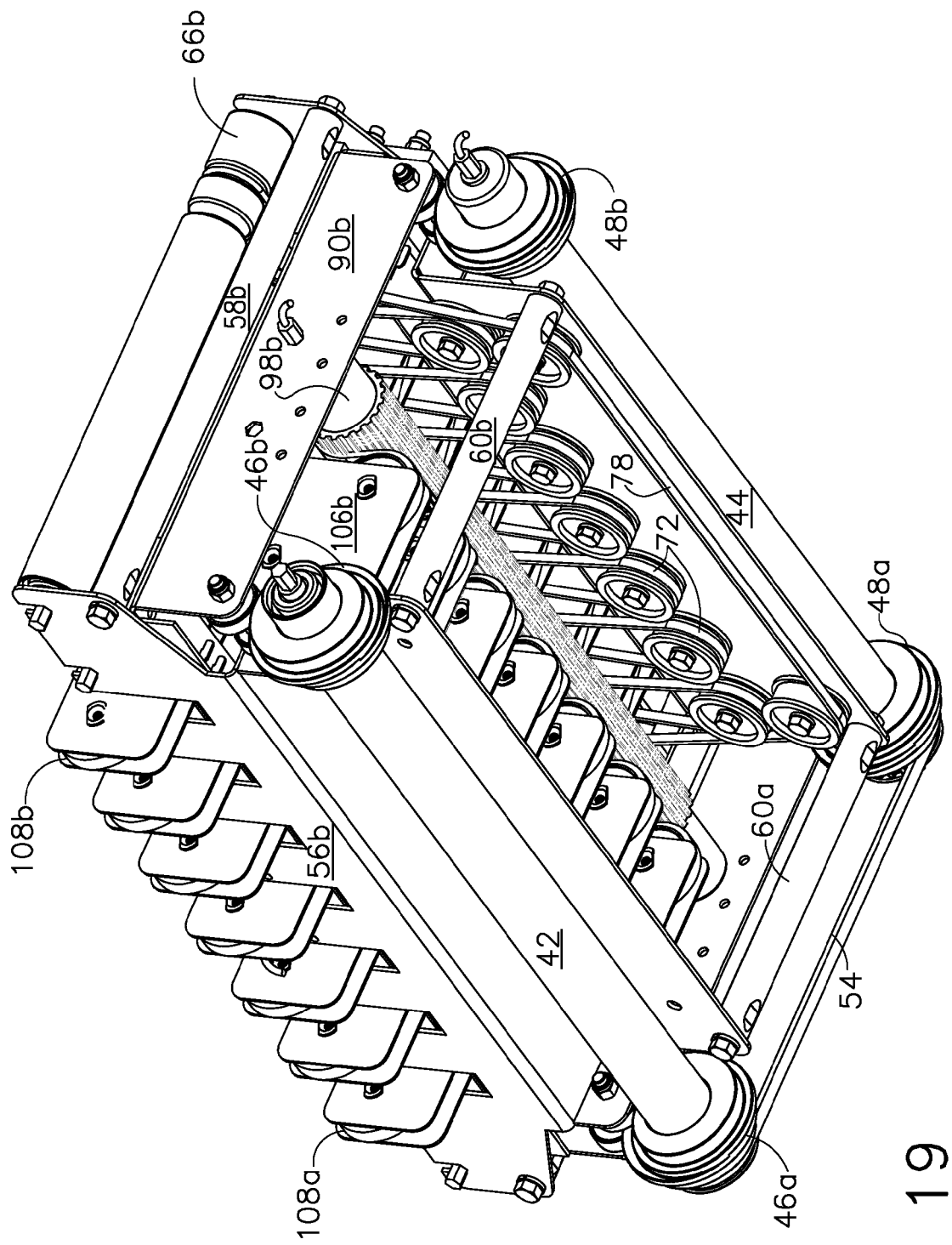
FIG. 19 is a perspective view from the bottom of the transfer conveyor of FIG. 2 with an end base frame and a side base frame omitted for clarity, showing the cams oriented to locate the conveying surface of the first conveying assembly a retracted position.
Figure 23:
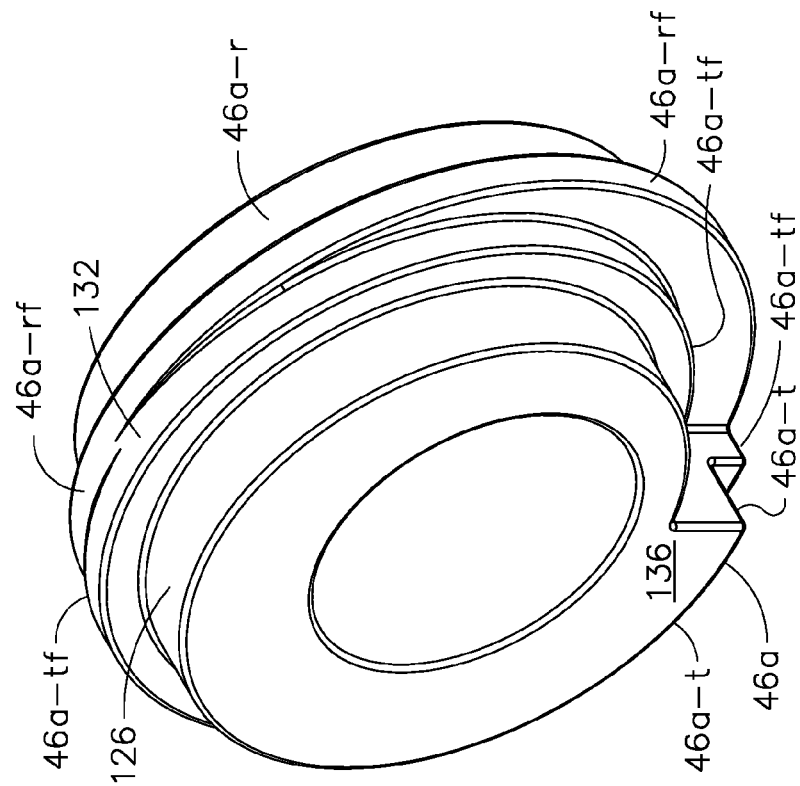
FIG. 23 is a perspective view of the cam shown in FIG. 20 from the upper right.
Figure 24:
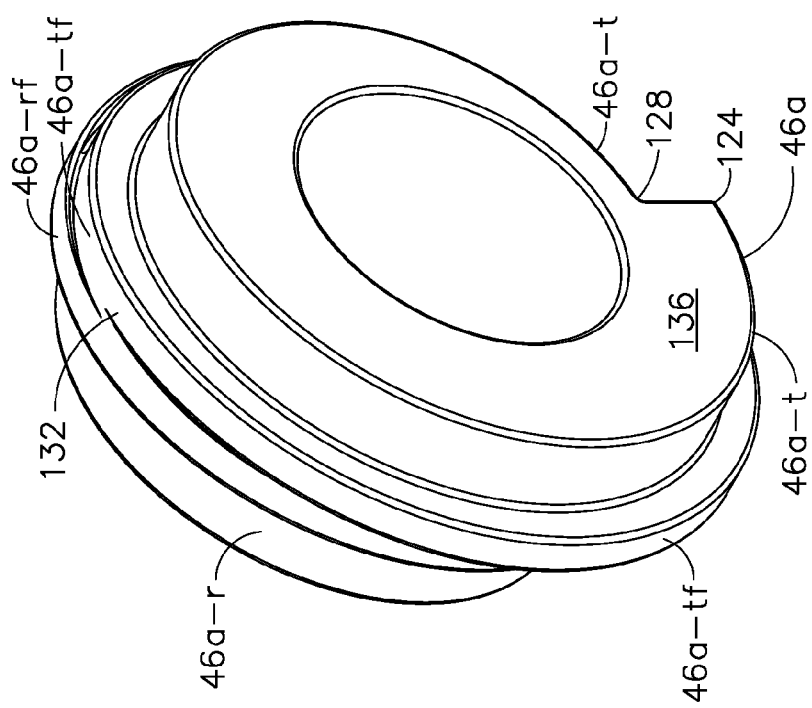
FIG. 24 is a perspective view of the cam shown in FIG. 20 from the upper left.
Figure 25:
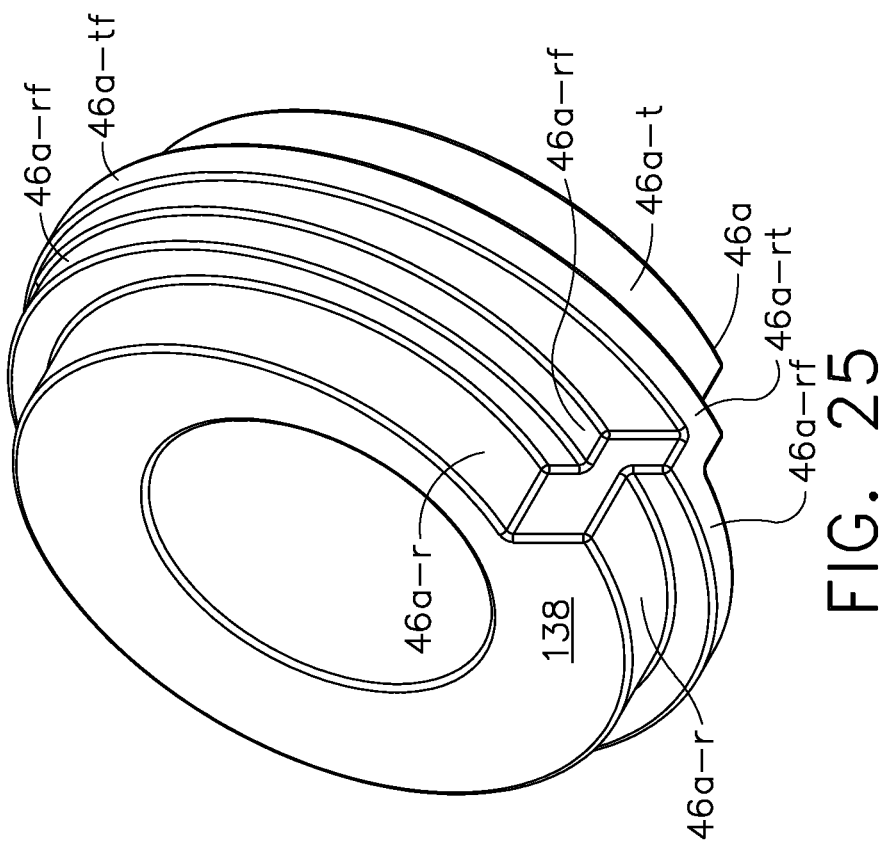
FIG. 25 is a perspective view of the opposite end of the cam shown in FIG. 20 from the lower right.
Figure 26:
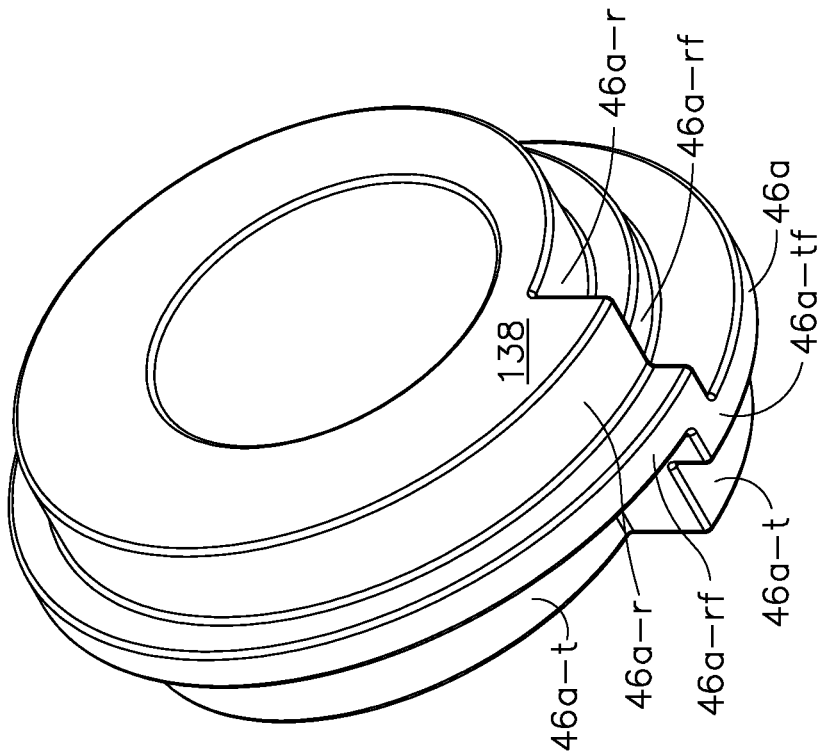
FIG. 26 is a perspective view of the opposite end of the cam shown in FIG. 20 from the lower left.
Figure 32:
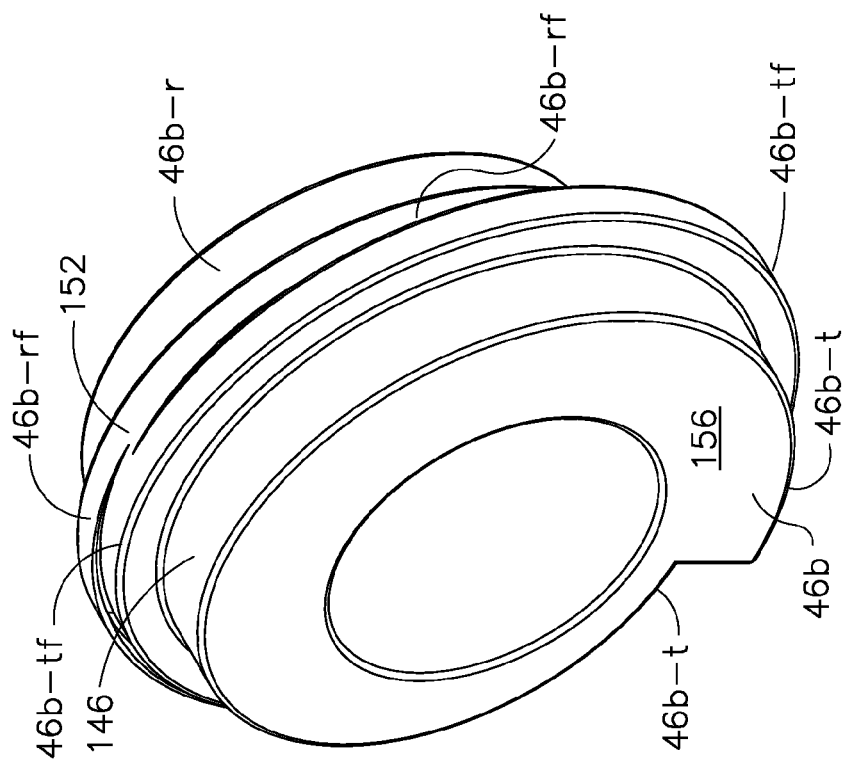
FIG. 32 is a perspective view of the cam shown in FIG. 29 from the upper right.
Figure 33:
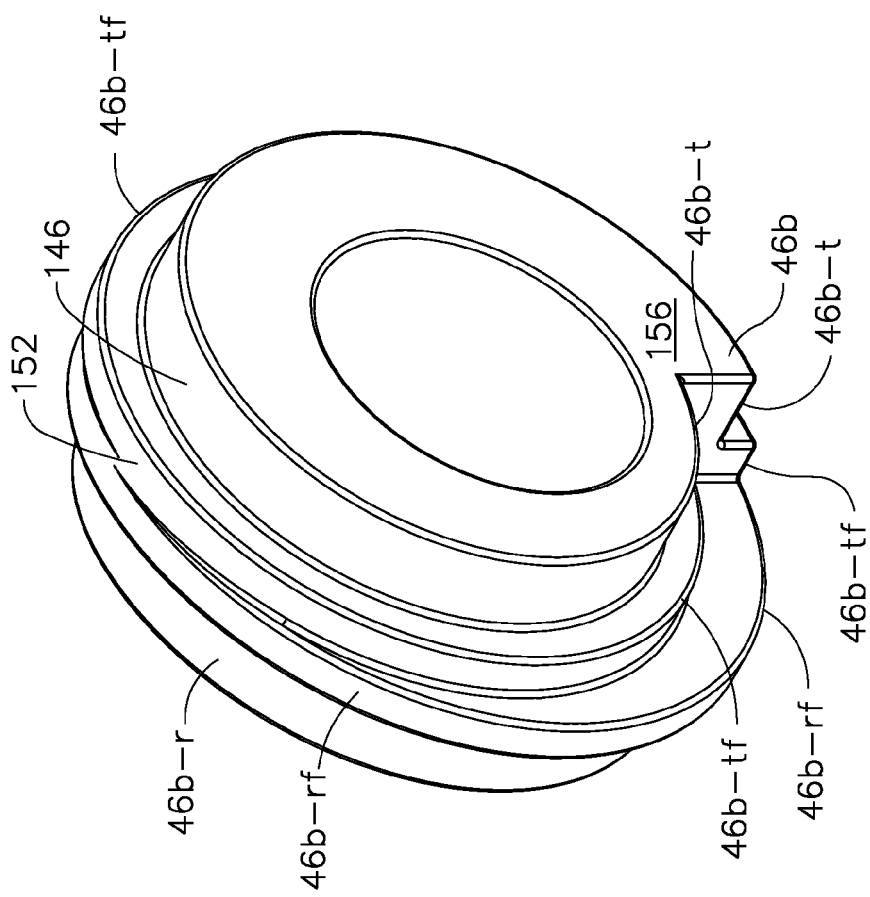
FIG. 33 is a perspective view of the cam shown in FIG. 29 from the upper left.

Referring to FIGS. 16 - 19, roller 42 is disposed at an angular position in FIGS. 14-16 at which cam 46*a* (and concomitantly cams 46*b*, 48*a* and 48*b*) is oriented so as to position conveying surface 122 at its conveying height and position conveying surface 120 at a retracted height. In FIG. 17, the radius of first conveying assembly cam track 46*a-r* adjacent cam follower 84*a* at 140 is at its minimum and the radius of second conveying assembly cam track 46*a-t* adjacent cam follower 104*a* at 142 is at its maximum. FIG. 18 shows an end view of cam 48*a* in this same angular orientation. Cam follower 102*a* is adjacent second conveying assembly cam track 48*a-t*, at its maximum radius.

In use, an article is received by transfer conveyor 12, conveyed along conveying surface 12 by rollers 66 at its conveying height, with second conveying assembly 28 at its retracted height, as seen in FIGS. 9-11. If the article is to be conveyed in a direction which is disposed at a transverse angle to the incoming direction of the article, i.e., in the conveying direction of second conveying assembly 28, driving of rollers 66 ceases when the article is at the desired position, with rollers 66 thereafter being free to coast. Roller 42 and drive roller 44 may be actuated at any appropriate time by causing drive roller 44 to rotate, based on the location of an article in anticipation of transferring that article, such as prior to ceasing to drive rollers 6. As cams 46*a*, 46*b*, 48*a*, 48*b* rotate, first conveying surface 120 remains at its conveying height through the initial rotation because the radii of first conveying assembly cam tracks 46*a-r*, 46*b-r*, 48*a-r* and 48*b-r* are constant at their maximum. As cams 46*a*, 46*b*, 48*a*, 48*b* are rotated, the radii of second conveying assembly cam tracks 46*a-t*, 46*b-t*, 48*a-t* and 48*b-t* increases up to their maximum, thereby raising second conveying assembly 28 and locating second conveying assembly conveying surface 122 co-incident with first conveying surface 120, such that the article is engaged by rollers 66 and belts 108, decelerating the article. As cams 46*a*, 46*b*, 48*a* and 48*b* rotate further, the radii of second conveying assembly cam tracks 46*a-t*, 46*b-t*, 48*a-t* and 48*b-t* remains constant at their maximum, maintaining second conveying surface 122 at its conveying height, and the radii of first conveying assembly cam tracks 46*a-r*, 46*b-r*, 48*a-r* and 48*b-r* decrease lowering first conveying assembly 26 to a retracted position out of contact with the article. At the appropriate time, such as as soon as rollers 66 begin being lowered, belts 108 may be driven to advance in the desired direction so as to discharge the article in the desired transverse direction.

Referring to FIGS. 29-37, cam 46*b* is illustrated, which identical to cam 48*b*, both of which are a mirror image of cam 46*a*. Cam 46*b* includes circumferential first conveying assembly cam track 46*b-r* and circumferential second conveying assembly cam track 46*b-t* disposed on opposite sides of cam 46*b*. Interposed between cam track 46*b-r* and 46*b-t*, are respective flanges 46*b-rf* and 46*b-tf*. As seen in FIGS. 29-31, cam track 46*b-t* extends circumferentially about cam 46*b* having a generally constant radius from point 144 to point 146, and has a decreasing radius from point 146 to point 148. Similarly, flange 46*b-tf* extends circumferentially about cam 46*b* having a generally constant radius from point 150 to point 152, and has a decreasing radius from point 152 to point 154. The difference in corresponding radii between cam track 46*b-t* and associated flange 46*b-tf* is substantially constant.

Figure 38:
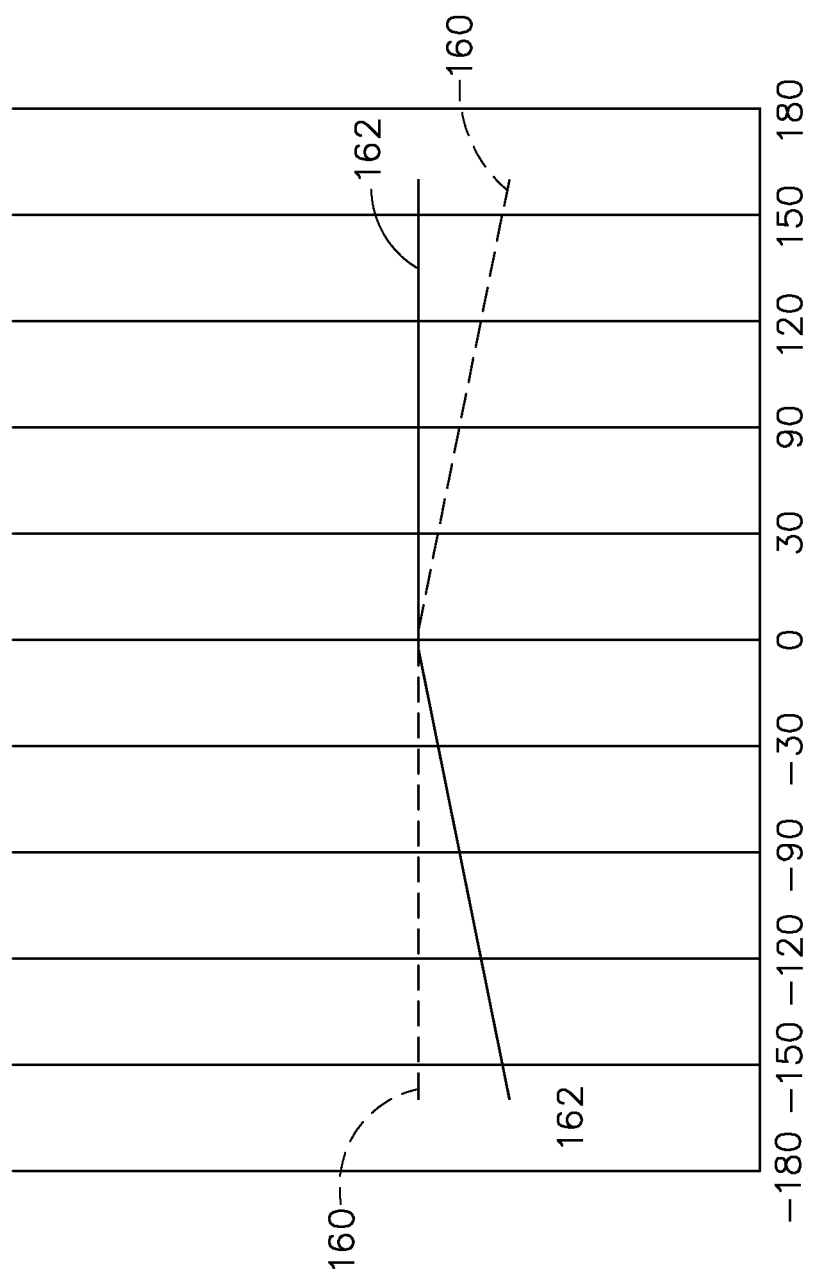
FIG. 38 diagrammatically shows the first conveying assembly cam track and the second conveying assembly cam track radii as a function of the cam angular position.

In FIG. 38, line 160 diagrammatically represents the radius of the first conveying assembly cam tracks and line 162 diagrammatically represents the radius of the second conveying assembly cam tracks plotted against the cam angular position. Zero degrees represents the position of the cams when both conveying surfaces 120 and 122 are both at their conveying height, co-incident with each other. In the embodiment depicted, cams 46*a*, 46*b*, 48*a*, 48*b* have less than 360° of rotation between the conveying height position of first conveying assembly 26 and the conveying height position of second conveying assembly 28. In FIG. 38, at less than −180° of rotation from the 0° position, the first conveying assembly cam track radius is at its maximum and the second conveying assembly cam track radius is at its minimum. Similarly, at less than 180° of rotation from the 0° position, the second conveying assembly cam track radius is at its maximum and the first conveying assembly cam track radius is at its minimum. Although the profile of the change in radii of the first conveying assembly cam track and the second conveying assembly cam track is diagrammatically illustrated as linear, any suitable profile may be used, such as a non-linear profile.

In the embodiment depicted, there are four spaced apart cams 46a, 46b, 48a, 48b, each with two respective cam tracks for the first conveying assembly and the second conveying assembly, producing through rotational cam action independent vertical movement of the first and second conveying surfaces from a respective conveying height to a retracted height. Fewer or more cams or other structures may be used to produce the same interdependent vertical movement through rotational motion. For example, a single cam or a single pair of cams could be used.

The foregoing description has been presented for purposes of illustration and description. It is not intended to be exhaustive or to limit the invention to the precise form disclosed. Obvious modifications or variations are possible in light of the above teachings. The embodiment was chosen and described in order to illustrate the principles of the invention and its application to thereby enable one of ordinary skill in the art to utilize the invention in various embodiments and with various modifications as are suited to the particular use contemplated. Although only a limited number of embodiments is explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the invention be defined by the claims submitted herewith.

The invention claimed is:

1. A transfer conveyor for selectively conveying articles initially traveling in a first direction at a conveying height to a transverse direction, said transfer conveyor comprising:
   a. a first conveying assembly defining a first conveying surface and comprising at least one first cam follower, said first conveying surface being moveable between said conveying height and a first retracted height;
   b. a second conveying assembly defining a second conveying surface and comprising at least one second cam follower, said second conveying surface being moveable between said conveying height and a second retracted height, said first and second conveying surfaces being coincident when disposed at said conveying height;
   c. at least one cam rotatable between a first position and a second position, and an intermediate position between said first and second positions, said at least one cam comprising a first circumferential cam track in engagement with said at least one first cam follower and a second circumferential cam track in engagement with said at least one second cam follower;
   d. said first circumferential cam track being configured to
      i. locate said first conveying surface at said conveying height when said at least one cam is disposed at said first position or said intermediate position or any position therebetween, and
      ii. to locate said first conveying surface at said first retracted height when said at least one cam is disposed at said second position; and
   e. said second circumferential cam track being configured to
      i. locate said second conveying surface at said second retracted height when said at least one cam is disposed at said first position; and
      ii. locate said second conveying surface at said conveying height when said at least one cam is disposed at said intermediate position or said second position or any position therebetween.

2. The transfer conveyor of claim 1, comprising at least one rotary actuator, and wherein said at least one cam comprises at least two spaced apart cams carried by said at least one rotary actuator, said at least one first cam follower comprising one respective first cam follower in engagement with a respective one of said first circumferential cam track, and said at least one second cam follower comprising one respective second cam follower in engagement with a respective one of said second circumferential cam track.

3. The transfer conveyor of claim 1, comprising first and second synchronized rotary actuators, said at least one cam comprises a first pair of spaced apart cams carried by said first rotary actuator and a second pair of spaced apart cams carried by said second actuator, said at least one first cam follower comprising one respective first cam follower in engagement with a respective one of said first circumferential cam tracks of said first and second pairs of spaced apart cams, and said at least one second cam follower comprising one respective second cam follower in engagement with a respective one of each of said second circumferential cam tracks of said first and second pairs of spaced apart cams.

4. The transfer conveyor of claim 1, wherein said first conveying assembly comprises a frame which moves with said first conveying surface, a plurality of rollers rotatably supported by said frame, and a source of rotational power configured to drive said plurality of rollers, said source being carried by said frame.

5. The transfer conveyor of claim 1, wherein said second conveying assembly comprises a frame which moves with said second conveying surface, a plurality of belts supported by said frame, and a source of rotational power configured to drive said plurality of belts, said source being carried by said frame.

6. A transfer conveyor for selectively conveying articles initially traveling in a first direction at a first conveying height to a transverse direction, said transfer conveyor comprising:
   a. a first conveying assembly defining a first conveying surface and comprising at least one first cam follower, said first conveying surface being moveable between said first conveying height and a first retracted height;
   b. a second conveying assembly defining a second conveying surface and comprising at least one second cam follower, said second conveying surface being moveable between a second conveying height and a second retracted height, said second conveying heights being lower than said first conveying height.

7. The transfer conveyor of claim 6, comprising:
   a. at least one cam rotatable between a first position and a second position, and an intermediate position between said first and second positions, said at least one cam comprising a first circumferential cam track in engagement with said at least one first cam follower and a second circumferential cam track in engagement with said at least one second cam follower;
   b. said first circumferential cam track being configured to
      i. locate said first conveying surface at said first conveying height when said at least one cam is disposed at said first position or said intermediate position or any position therebetween, and
      ii. to locate said first conveying surface at said first retracted height when said at least one cam is disposed at said second position; and
   c. said second circumferential cam track being configured to i. locate said second conveying surface at said second retracted height when said at least one cam is disposed at said first position; and
ii. locate said second conveying surface at said second conveying height when said at least one cam is disposed at said intermediate position or said second position or any position therebetween.

8. A transfer conveyor for selectively conveying articles initially traveling in a first direction to a transverse direction, said transfer conveyor comprising:
   a. a first conveying assembly comprising a plurality of spaced apart first conveying elements defining a first conveying surface, said first conveying surface configured to convey articles thereon in said first direction;
   b. a second conveying assembly comprising a plurality of spaced apart cartridges, each cartridge of the plurality of spaced apart cartridges interposed between respective associated pairs of said plurality of first conveying elements, each said cartridge comprising a respective second conveying element, said second conveying elements collectively defining a second conveying surface, said second conveying surface configured to convey articles thereon in said transverse direction;
   c. a drive element externally engaging and driving said second conveying elements such that one or more of said cartridges may be removed from being interposed between its associated pair of said first conveying elements without disassembly of said cartridges.

9. The transfer conveyor of claim 8, wherein one or more of said cartridges may be removed from being interposed between its associated pair of said first conveying elements without adjustment of said drive element.

10. The transfer conveyor of claim 8, wherein said drive element positively engages and drives said second conveying elements.

11. The transfer conveyor of claim 10, wherein each of said second conveying elements comprises a respective external toothed surface and said drive element comprises an external toothed surface in engagement with said respective external toothed surface of said second conveying elements.

\* \* \* \* \*